US011979901B2

(12) United States Patent
Hosseini et al.

(10) Patent No.: US 11,979,901 B2
(45) Date of Patent: May 7, 2024

(54) PRIORITY-BASED SEARCH SPACE CATEGORIZATION

(71) Applicant: QUALCOMM Incorporated, San Diego, CA (US)

(72) Inventors: Seyedkianoush Hosseini, San Diego, CA (US); Peter Gaal, San Diego, CA (US); Huilin Xu, San Diego, CA (US); Wanshi Chen, San Diego, CA (US); Aamod Khandekar, San Diego, CA (US); James Beckman, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 16/991,978

(22) Filed: Aug. 12, 2020

(65) Prior Publication Data

US 2021/0051685 A1 Feb. 18, 2021

Related U.S. Application Data

(60) Provisional application No. 62/888,079, filed on Aug. 16, 2019.

(51) Int. Cl.
*H04W 72/566* (2023.01)
*H04W 72/20* (2023.01)
*H04W 72/23* (2023.01)

(52) U.S. Cl.
CPC ......... *H04W 72/566* (2023.01); *H04W 72/20* (2023.01); *H04W 72/23* (2023.01)

(58) Field of Classification Search
CPC ......... H04W 72/1247; H04W 72/1278; H04W 72/14
See application file for complete search history.

(56) References Cited

U.S. PATENT DOCUMENTS

| 9,312,997 | B2* | 4/2016 | Kim ..................... H04L 5/0037 |
| 2019/0191360 | A1 | 6/2019 | Sun et al. |
| 2019/0261229 | A1* | 8/2019 | Singh ................ H04W 36/0044 |
| 2020/0351896 | A1 | 11/2020 | Taherzadeh Boroujeni et al. |
| 2021/0084620 | A1 | 3/2021 | Tooher et al. |

FOREIGN PATENT DOCUMENTS

| WO | WO-2019099435 A1 | 5/2019 |
| WO | WO-2019139955 A1 | 7/2019 |

OTHER PUBLICATIONS

International Search Report and Written Opinion—PCT/US2020/046193—ISA/EPO—dated Nov. 27, 2020.

* cited by examiner

*Primary Examiner* — Rhonda L Murphy
(74) *Attorney, Agent, or Firm* — Holland & Hart LLP

(57) ABSTRACT

Methods, systems, and devices for wireless communications are described. A user equipment (UE) may transmit an indication that the UE is capable of supporting one or more channels of a first priority and one or more channels of a second priority, where the first priority is higher than the second. The UE may receive signaling indicating a search space set in a control-resource set (CORESET) that corresponds to grant candidates for scheduling the one or more channels of the first priority. The UE may determine a second search space set in the CORESET that corresponds to grant candidates for scheduling the one or more channels of the second priority. The UE may decode, within a search space of the first search space set, a grant for scheduling the one or more channels of the first priority.

33 Claims, 19 Drawing Sheets

PRIORITY-BASED SEARCH SPACE CATEGORIZATION

CROSS REFERENCE

The present Application for Patent claims the benefit of U.S. Provisional Patent Application No. 62/888,079 by HOSSEINI et al., entitled "PRIORITY-BASED SEARCH SPACE CATEGORIZATION," filed Aug. 16, 2019, assigned to the assignee hereof, and expressly incorporated by reference herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support priority-based search space categorization. Generally, the described techniques provide for a user equipment (UE) to transmit an indication that the UE is capable of supporting one or more channels of a first priority and one or more channels of a second priority, where the first priority is higher than the second. The UE may receive signaling indicating a search space set in a control-resource set (CORESET) that corresponds to grant candidates for scheduling the one or more channels of the first priority. The UE may determine a second search space set in the CORESET that corresponds to grant candidates for scheduling the one or more channels of the second priority. The UE may decode, within a search space of the first search space set, a grant for scheduling the one or more channels of the first priority. Additionally, the UE may decode, within a second search space of the first search space set or within a search space of the second search space set, a grant for scheduling the one or more channels of the second priority.

A method for wireless communication at a UE is described. The method may include receiving signaling that indicates a first search space set in a CORESET that corresponds to grant candidates for scheduling one or more channels of a first priority, determining a second search space set in the CORESET that corresponds to grant candidates for scheduling one or more channels of a second priority, where the first priority is higher than the second priority, and decoding, within a search space of the first search space set, a grant for scheduling the one or more channels of the first priority.

An apparatus for wireless communication at a UE is described. The apparatus may include a processor, memory in electronic communication with the processor, and instructions stored in the memory. The instructions may be executable by the processor to cause the apparatus to receive signaling that indicates a first search space set in a CORESET that corresponds to grant candidates for scheduling one or more channels of a first priority, determine a second search space set in the CORESET that corresponds to grant candidates for scheduling one or more channels of a second priority, where the first priority is higher than the second priority, and decode, within a search space of the first search space set, a grant for scheduling the one or more channels of the first priority.

Another apparatus for wireless communication at a UE is described. The apparatus may include means for receiving signaling that indicates a first search space set in a CORESET that corresponds to grant candidates for scheduling one or more channels of a first priority, means for determining a second search space set in the CORESET that corresponds to grant candidates for scheduling one or more channels of a second priority, where the first priority is higher than the second priority, and means for decoding, within a search space of the first search space set, a grant for scheduling the one or more channels of the first priority.

A non-transitory computer-readable medium storing code for wireless communication at a UE is described. The code may include instructions executable by a processor to receive signaling that indicates a first search space set in a CORESET that corresponds to grant candidates for scheduling one or more channels of a first priority, determine a second search space set in the CORESET that corresponds to grant candidates for scheduling one or more channels of a second priority, where the first priority is higher than the second priority, and decode, within a search space of the first search space set, a grant for scheduling the one or more channels of the first priority.

Some examples of the method, apparatuses, and non-transitory computer-readable medium described herein may further include operations, features, means, or instructions for transmitting, to a base station and prior to receiving the signaling, an indication that the UE may be capable of supporting the one or more channels of the first priority and the one or more channels of the second priority, where the signaling may be received from the base station.

Some examples of the method, apparatuses, and non-transitory computer-readable medium described herein may further include operations, features, means, or instructions for receiving signaling that indicates a third search space set, where the first search space set may be a subset of the third search space set, and where determining the second search space set includes, and determining that the second search space set includes each search space of the third search space set that may be not a search space of the first search space set.

Some examples of the method, apparatuses, and non-transitory computer-readable medium described herein may further include operations, features, means, or instructions for receiving signaling that indicates a format for downlink control information (DCI) corresponding to the grant candidates associated with the first search space set.

In some examples of the method, apparatuses, and non-transitory computer-readable medium described herein, the first search space set further corresponds to additional grant candidates scheduling the one or more channels of the second priority, and further including decoding a grant for scheduling the one or more channels of the second priority within a second search space of the first search space set or within a search space of the second search space set.

Some examples of the method, apparatuses, and non-transitory computer-readable medium described herein may further include operations, features, means, or instructions for decoding each search space of the first search space set, and failing to decode, in each search space of the first search space set, a grant for scheduling the one or more channels of the second priority based on the first search space set being associated with the one or more channels of the first priority.

Some examples of the method, apparatuses, and non-transitory computer-readable medium described herein may further include operations, features, means, or instructions for determining that the grant may be for scheduling the one or more channels of the first priority based on a radio network temporary identifier associated with the grant, a priority indication bit field associated with the grant, or a combination thereof.

In some examples of the method, apparatuses, and non-transitory computer-readable medium described herein, no search spaces of the second search space set correspond to additional grant candidates for scheduling the one or more channels of the first priority.

Some examples of the method, apparatuses, and non-transitory computer-readable medium described herein may further include operations, features, means, or instructions for decoding each search space of the second search space set, and failing to decode, in each search space of the second search space set, a grant for scheduling the one or more channels of the first priority based on the second search space set being associated with the one or more channels of the second priority.

In some examples of the method, apparatuses, and non-transitory computer-readable medium described herein, the grant candidates for scheduling the one or more channels of the first priority and the grant candidates for scheduling the one or more channels of the second priority may be physical downlink control channel candidates.

In some examples of the method, apparatuses, and non-transitory computer-readable medium described herein, the one or more channels of the first priority may be associated with ultra-reliable low-latency communications (URLLC) and the one or more channels of the second priority may be associated with enhanced mobile broadband (eMBB).

A method for wireless communications is described. The method may include receiving, from a UE, an indication that the UE is capable of supporting one or more channels of a first priority and one or more channels of a second priority, where the first priority is higher than the second priority, identifying a first search space set in a CORESET that corresponds to grant candidates for scheduling the one or more channels of the first priority and a second search space set in the CORESET that corresponds to grant candidates for scheduling the one or more channels of the second priority, and transmitting, to the UE, a grant for scheduling the one or more channels of the first priority over control channel elements corresponding to a search space of the first search space set.

An apparatus for wireless communications is described. The apparatus may include a processor, memory in electronic communication with the processor, and instructions stored in the memory. The instructions may be executable by the processor to cause the apparatus to receive, from a UE, an indication that the UE is capable of supporting one or more channels of a first priority and one or more channels of a second priority, where the first priority is higher than the second priority, identify a first search space set in a CORESET that corresponds to grant candidates for scheduling the one or more channels of the first priority and a second search space set in the CORESET that corresponds to grant candidates for scheduling the one or more channels of the second priority, and transmit, to the UE, a grant for scheduling the one or more channels of the first priority over control channel elements corresponding to a search space of the first search space set.

Another apparatus for wireless communications is described. The apparatus may include means for receiving, from a UE, an indication that the UE is capable of supporting one or more channels of a first priority and one or more channels of a second priority, where the first priority is higher than the second priority, means for identifying a first search space set in a CORESET that corresponds to grant candidates for scheduling the one or more channels of the first priority and a second search space set in the CORESET that corresponds to grant candidates for scheduling the one or more channels of the second priority, and means for transmitting, to the UE, a grant for scheduling the one or more channels of the first priority over control channel elements corresponding to a search space of the first search space set.

A non-transitory computer-readable medium storing code for wireless communications is described. The code may include instructions executable by a processor to receive, from a UE, an indication that the UE is capable of supporting one or more channels of a first priority and one or more channels of a second priority, where the first priority is higher than the second priority, identify a first search space set in a CORESET that corresponds to grant candidates for scheduling the one or more channels of the first priority and a second search space set in the CORESET that corresponds to grant candidates for scheduling the one or more channels of the second priority, and transmit, to the UE, a grant for scheduling the one or more channels of the first priority over control channel elements corresponding to a search space of the first search space set.

Some examples of the method, apparatuses, and non-transitory computer-readable medium described herein may further include operations, features, means, or instructions for transmitting, to the UE, signaling indicating the first search space set.

Some examples of the method, apparatuses, and non-transitory computer-readable medium described herein may further include operations, features, means, or instructions for transmitting, to the UE, signaling indicating a third search space set, where the first search space set may be a subset of the third search space set, and where each search space of the third search space set that may be not a search space of the first search space set may be a search space of the second search space set.

Some examples of the method, apparatuses, and non-transitory computer-readable medium described herein may further include operations, features, means, or instructions for transmitting, to the UE, signaling that indicates a format for the grant candidates associated with the first search space set.

Some examples of the method, apparatuses, and non-transitory computer-readable medium described herein may further include operations, features, means, or instructions for transmitting, to the UE, a grant for scheduling the one or more channels of the second priority over second control channel elements corresponding to a second search space of the first search space set based on the first search space set being associated with the first priority.

Some examples of the method, apparatuses, and non-transitory computer-readable medium described herein may further include operations, features, means, or instructions for refraining from transmitting, to the UE, a second grant for scheduling the one or more channels of the first priority over one or more control channel elements corresponding to a search space of the second search space set based on the second search space set being associated with the one or more channels of the second priority.

In some examples of the method, apparatuses, and non-transitory computer-readable medium described herein, the grant includes DCI.

DETAILED DESCRIPTION

Figure 1:
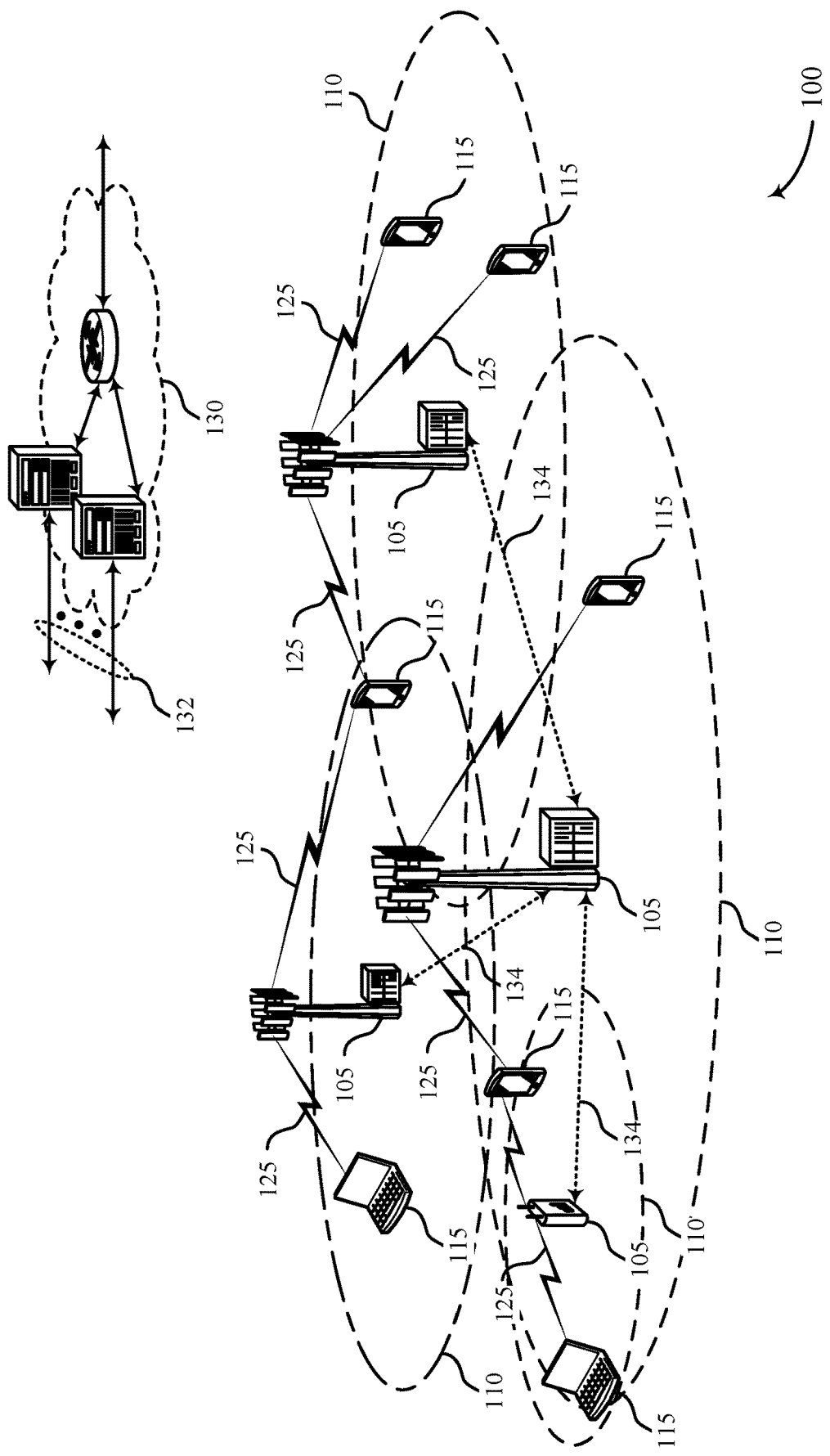
FIG. 1 illustrates an example of a wireless communications system that supports priority-based search space categorization in accordance with aspects of the present disclosure.

In some cases, a user equipment (UE) may receive downlink control information (DCI) in a control-resource set (CORESET) over one or more control channel elements (CCE). The DCI may include an ultra-reliable low-latency communications (URLLC) grant that schedules a physical downlink shared channel (PDSCH) or a physical uplink shared channel (PUSCH) transmission associated with URLLC traffic. Alternatively, the DCI may include an enhanced mobile broadband (eMBB) grant that schedules a PDSCH or PUSCH transmission associated with eMBB traffic.

A UE may receive a downlink grant in a (CORESET) over one or more CCEs that schedule a data transmission (e.g., a PDSCH transmission or a PUSCH transmission). The grant may be an ultra-reliable low-latency communications (URLLC) grant or may be an eMBB grant. In some cases, the UE may receive multiple grants within a single CORESET. For instance, the UE may receive an eMBB grant over a first set of CCEs within the CORESET and may receive a URLLC grant over a second set of CCEs within the CORESET.

To detect where within the CORESET a grant may be located, the UE may perform blind decodes (BD) for some or each search space in a search space set. Each search space may span a different set of CCEs of the CORESET. In the case that the UE receives multiple grants within a single CORESET and that the size of DCI associated with each grant is the same, the UE may perform a BD over a grant candidate of aggregation level L in any search space set. Such a situation may be referred to as search space sharing.

Generally, if a UE 115 is capable of supporting two component carriers (CC) in downlink, uplink, or both, the UE 115 may be able to perform twice a number of BDs for a single CC as compared to two CCs. For the case where a UE decodes a URLLC grant and an eMBB grant within a single CC, the UE may use twice the processing power to process the data transmissions associated with both grants as compared to processing the data transmission associated with one of the grants. However, in the case where a UE decodes a URLLC grant on one CC and an eMBB grant on another CC, the UE may use less than twice the processing power to process the data transmissions associated with both grants as compared to processing the data transmission associated with one grant on a single CC. The UE may use less than twice the processing power because some of the blocks for data processing may be shared between the two CCs. As such, a UE may take longer to process data transmissions associated with two grants in one CC as compared to processing data transmissions associated with two grants in two CCs.

In some cases, the UE may successfully decode two grants within a threshold number of BDs from the last performed BD. If the UE had decoded one grant in one CC and one in the other, the UE may have had sufficient time to process the corresponding data transmissions within a given time constraint (e.g., before resources for transmitting feedback over a physical uplink control channel (PUCCH) have elapsed). However, because the UE decoded both grants within a single CC, the UE may take a longer time to process the corresponding data transmissions and may exceed the given time constraint.

To enable the UE to have sufficient time to process both data transmissions, a UE may divide the search space set into a first subset over which the UE may decode one or both grants and a second subset over which the UE may decode one, but not both, grants. The UE may perform BDs for the first subset first and may perform BDs for the second subset after performing the BDs for the first subset. As such, if the UE fails to decode any grants when performing BDs for the first subset, the UE may decode no more than one grant in the second subset. Thus, when two grants are within the CORESET, the UE may decode both grants in the first subset and have at least the time used by the UE to perform BDs for the second subset to process both. Alternatively, the UE may decode one grant in the first subset and the other grant in the other subset, and may be able to at least partially process the data transmission associated with the grant decoded in the first subset before processing the data transmission associated with the grant decoded in the second subset.

Which grant the UE may decode in either subset (e.g., the first or the second subsets) and which grant the UE may decode in one subset (e.g., the first subset) may depend on a priority associated with each of the grants. For instance, if one of the grants is associated with channels of higher priority (e.g., URLLC PUSCH or URLLC PDSCH) than the channels of the other grant (e.g., eMBB PUSCH or eMBB PDSCH), the higher-priority grant may be decoded in the first subset and the lower-priority grant may be decoded in the first subset or the second subset. In one example, URLLC grants may have a higher priority than eMBB grants. As such, URLLC grants may be decoded in the first subset, but not the second, and eMBB grants may be decoded in the first or second subsets. Alternatively, eMBB grants may be decoded in the second subset, but not the first.

Aspects of the disclosure are initially described in the context of a wireless communications system. Additional aspects of the disclosure are described in the context of an additional wireless communications system, a BD order, priority-based BD processes, and a process flow. Aspects of the disclosure are further illustrated by and described with reference to apparatus diagrams, system diagrams, and flowcharts that relate to priority-based search space categorization.

FIG. 1 illustrates an example of a wireless communications system 100 that supports priority-based search space categorization in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, such as the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission, reception, or both by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of an mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105, UEs 115, or both that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some cases, URLLC and eMBB grants may be used in a differentiated framework. For instance, URLLC and eMBB may be on two virtual component CC that are placed on the same frequency. In such cases, envelope performance may be traded off for supporting two services on the same carrier. In such cases, an increased number of CCEs and BDs may be utilized. Generally, in such cases, eMBB grants and URLLC grants may be distinguished because eMBB grants and URLLC grants may be in different CORESETS, where some CORESETs are configured for monitoring eMBB DCI and other CORESETs may be configured for monitoring URLLC DCI. For instance, up to 3 CORESETs may be monitored for eMBB DCI and X CORESETs may be monitored for URLLC DCI, where X may equal 1 for sub-6 GHz (i.e., FR1). Alternatively, eMBB grants and URLLC grants may be distinguished because they may have different DCI sizes. For instance, the size may be 3 for eMBB with cell radio network temporary identifier (C-RNTI), 1 for URLLC with C-RNTI, and 1 for other radio network temporary identifiers (RNTIs).

In other cases, URLLC and eMBB grants may be used in a non-differentiated framework. For instance, in some examples, URLLC and eMBB grants may not be separated explicitly. In such cases, the same DCI format and size with no additional priority information may be used. Additionally, the DCI size budget, the number of CORESETs, and the number of BDs may not be increased. Alternatively, in other examples, the eMBB and URLLC may not be differentiable before decoding the DCI. For instance, once a UE 115 checks an RNTI associated with the DCI or a priority indication field in the DCI, the UE 115 may be able to tell if the grant is a grant for high priority channels (e.g., URLLC PUSCH or URLLC PDSCH) or a grant for low priority channels (e.g., eMBB PUSCH or eMBB PDSCH). Generally, the examples described throughout the present disclosure may apply to the case where grants are distinguishable after decoding.

Figure 3:
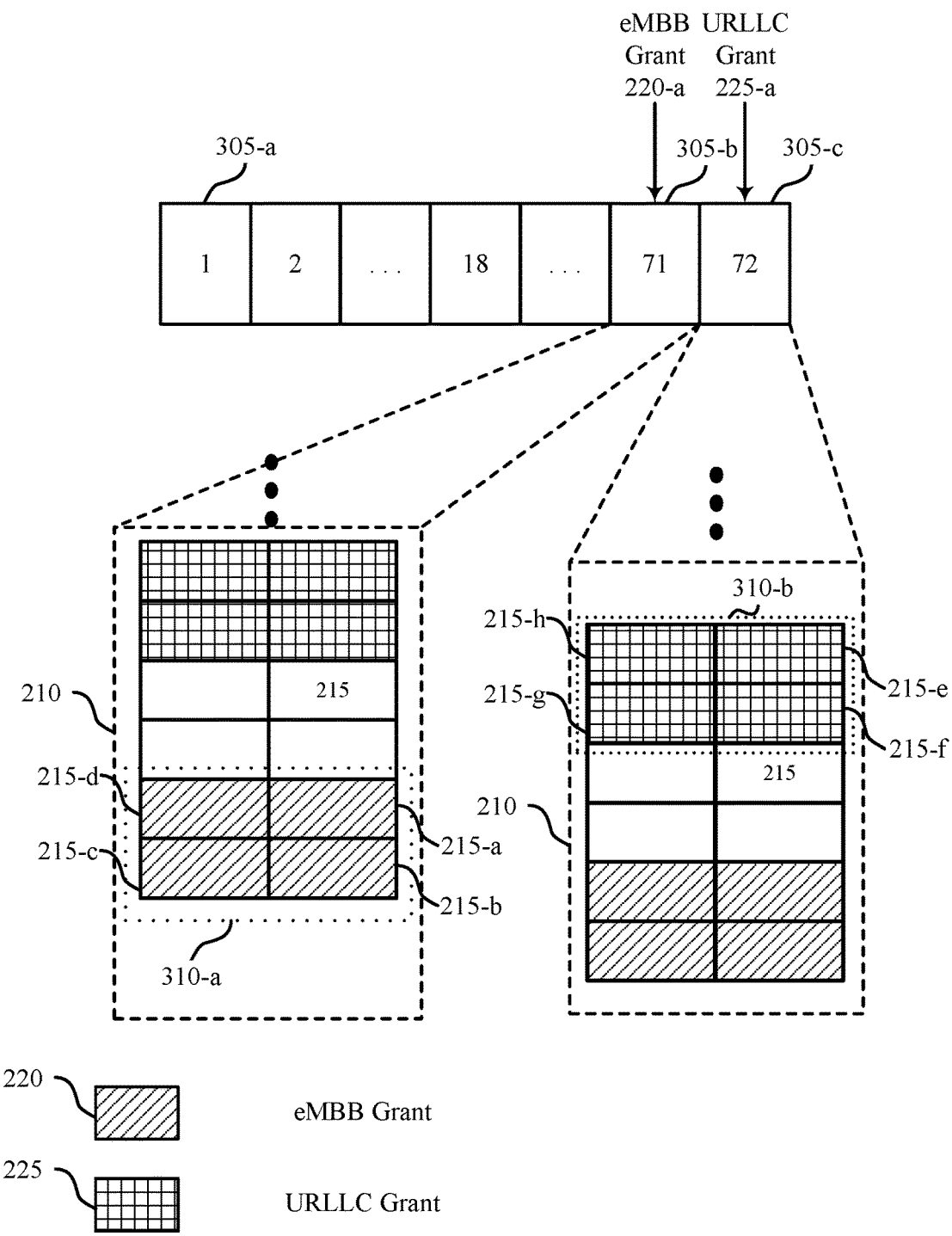
FIG. 3 illustrates an example of a blind decode (BD) order that supports priority-based search space categorization in accordance with aspects of the present disclosure.

If a UE 115 is not able to distinguish between whether a DCI corresponds to an eMBB grant or a URLLC grant before decoding the DCI, then the processing timeline may be impacted, such as demonstrated with regards to FIG. 3. The issue may become more pronounced with eMBB and URLLC following different minimum processing capability timelines. Additionally or alternatively, the issue may become more pronounced as the number of BDs per slot increase.

In some cases, a UE 115 may be configured for operation with carrier aggregation. If the UE 115 indicates support of search space sharing through searchSpaceSharingCA-UL or searchSpaceSharing-DL and if the UE 115 has a physical downlink control channel (PDCCH) candidate with CCE aggregation level L in CORESET p. for a DCI format 0_1 or a DCI format 1_1, having a first size and associated with a serving cell $n_{CI,2}$, the UE 115 may receive a corresponding PDCCH through a PDCCH candidate with CCE aggregation level L in CORESET p. for a DCI format 0_1 or a DCI format 1_1, respectively, having a second size and associated with servicing cell $n_{CI,1}$ if the first size and the second size are the same. Such a situation may be referred to as search space sharing.

If URLLC grants and eMBB grants are used in a differentiated framework, as described herein, the base station 105 communicating with the UE 115 may transmit different DCI sizes for scheduling eMBB and URLLC or may transmit the grants on different CORSETs, which may avoid search space sharing. However, if the URLLC grants and eMBB grants are used in a non-differentiated framework, also as described herein, the base station 105 may use other methods, such as described herein with regards to FIG. 4, to avoid issues that may arise from search space sharing, such as described with reference to FIG. 3.

In some cases, a UE 115 may transmit an indication that the UE 115 is capable of supporting one or more channels of a first priority and one or more channels of a second priority, where the first priority is higher than the second. The UE 115 may receive signaling indicating a search space set in a CORESET that corresponds to grant candidates for scheduling the one or more channels of the first priority. The UE 115 may determine a second search space set in the CORESET that corresponds to grant candidates for scheduling the one or more channels of the second priority. The UE 115 may decode, within a search space of the first search space set, a grant for scheduling the one or more channels of the first priority.

Figure 2:
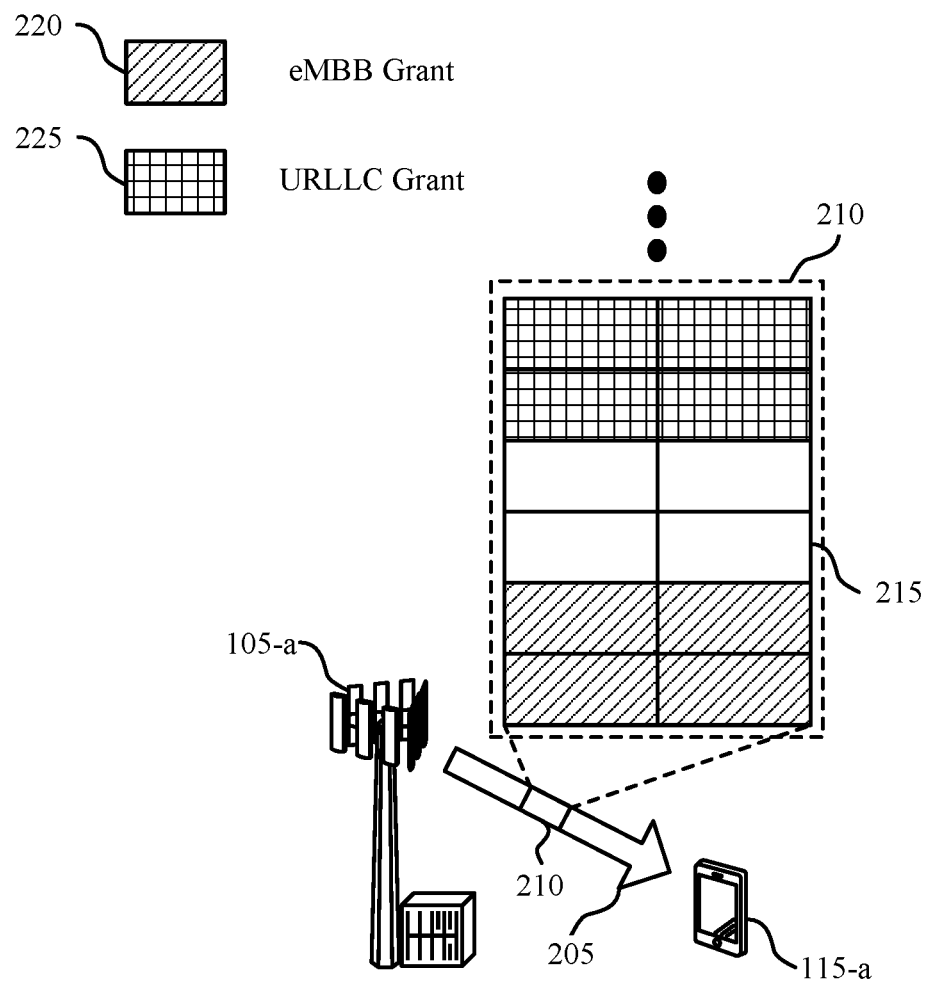
FIG. 2 illustrates an example of a wireless communications system that supports priority-based search space categorization in accordance with aspects of the present disclosure.

FIG. 2 illustrates an example of a wireless communications system 200 that supports priority-based search space categorization in accordance with aspects of the present disclosure. In some examples, wireless communications system 200 may implement aspects of wireless communications system 100. For instance, wireless communications system 200 may include UE 115-a, which may be an example of a UE 115 as described with reference to FIG. 1, and base station 105-a, which may be an example of a base station 105 as described with reference to FIG. 1. URLLC grants and eMBB grants are described throughout FIGS. 2, 3 and 4 to illustrate one example of the methods of the disclosure as described herein. Generally, eMBB grants 220 may be considered to be grants for low priority channels (e.g., grants for eMBB PUSCH or eMBB PDSCH) and URLLC grants 225 may be considered to be grants for high priority channels (e.g., grants for URLLC PUSCH or URLLC PDSCH).

Base station 105-a may transmit downlink control transmissions to UE 115-a via PDCCH 205. In some cases, Base station 105-a may transmit downlink control transmissions over a CORESET 210 including CCEs 215. In some cases, a first subset of the CCEs 215 may contain an eMBB grant 220 and a second subset of CCEs may contain a URLLC grant 225. The eMBB grant 220 and the URLLC grant 225 may be examples of DCI.

Upon decoding the eMBB grant 220, UE 115-a may use the eMBB grant 220 to process a corresponding PDSCH or to transmit a PUSCH. Likewise, upon decoding the URLLC grant 225, the UE 115 may use the URLLC grant 225 to process a corresponding PDSCH or to transmit a PUSCH. In some cases, if processing a PDSCH, the UE 115 may transmit feedback (e.g., HARQ acknowledgement (HARQ-ACK) feedback) via physical uplink control channel (PUCCH) resources to base station 105-a.

FIG. 3 illustrates an example of a BD order 300 that supports priority-based search space categorization in accordance with aspects of the present disclosure. In some examples, BD order 300 may implement aspects of wireless communications system 100. For instance, BD order 300 may be an order in which BDs 305 are performed by a UE 115. For instance, BD 305-a (i.e., BD #1) may be performed first and BD 305-c (i.e., BD #72) may be performed last. BD order 300 may represent BDs performed over a single slot and may vary according to a subcarrier spacing (e.g., 30 kHz). Although FIGS. 3 and 4 illustrate examples involving PDSCHs, it should be understood that similar examples using PUSCHs instead of PDSCHs may be performed without deviating from the scope of the present disclosure.

Each BD 305 may correspond to a search space 310 over a grant candidate. For instance, BD 305-b may have an associated search space 310-a and BD 305-c may have an associated search space 310-b. Each search space 310 may span a number of CCEs 215. For instance, in the present example, search space 310-a may span CCEs 215-a, 215-b, 215-c, and 215-d and search space 310-b may span CCEs 215-e, 215-f, 215-g, and 215-h. Because eMBB grant 220 and URLLC grant 225 are the same size and are within the same CORESET, search space sharing may be allowed.

In the present example, eMBB grant 220-a may be decoded at BD 305-b (i.e., BD #71) and URLLC grant 225-a may be decoded at BD 305-c (i.e., BD #72). If the UE 115 had decoded the eMBB grant 220-a at BD 305-b and did not decode URLLC grant 225-a at BD 305-c, the UE 115 may have sufficient time to decode the corresponding PDSCH transmission associated with eMBB grant 220-a before resources for sending PUCCH feedback have elapsed. Alternatively, if the UE 115 had decoded the URLLC grant 225-a at BD 305-c and did not decode eMBB grant 220-a at BD 305-b, the UE 115 may have sufficient time to decode the corresponding PDSCH transmission associated with URLLC grant 225-a before resources for sending PUCCH feedback have elapsed. However, if, as in the present example, the UE 115 decodes eMBB grant 220-a at BD 305-b and also decodes URLLC grant 225-a at BD 305-c, the UE 115 may not have sufficient time to process both corresponding PDSCH transmissions before resources for sending PUCCH feedback have elapsed.

The lack of sufficient time may, at least in part, be due to a lack of power capability on the part of the UE 115. For instance, to process PDSCHs associated with eMBB grant 220-a and URLLC grant 225-a before resources for sending PUCCH feedback have elapsed, the UE 115 may use a processing power 2X, where X may be a processing power used to process a PDSCH on one CC. However, the UE 115 may have a maximum processing power $\alpha X$, where $\alpha X$ may be the processing power a UE 115 may use to process a PDSCH associated with an eMBB grant 220 received on one CC simultaneously with a PDSCH associated with a URLLC grant 225 received on another CC. Generally, $\alpha X < 2X$, as blocks for data processing may be shared between the two CCs. As such, the UE 115 may not have enough time to process both PDSCHs on a single CC before the resources for sending PUCCH feedback have elapsed. Methods of compensating for the deficiency in power may be described with reference to FIG. 4.

Figure 4A:
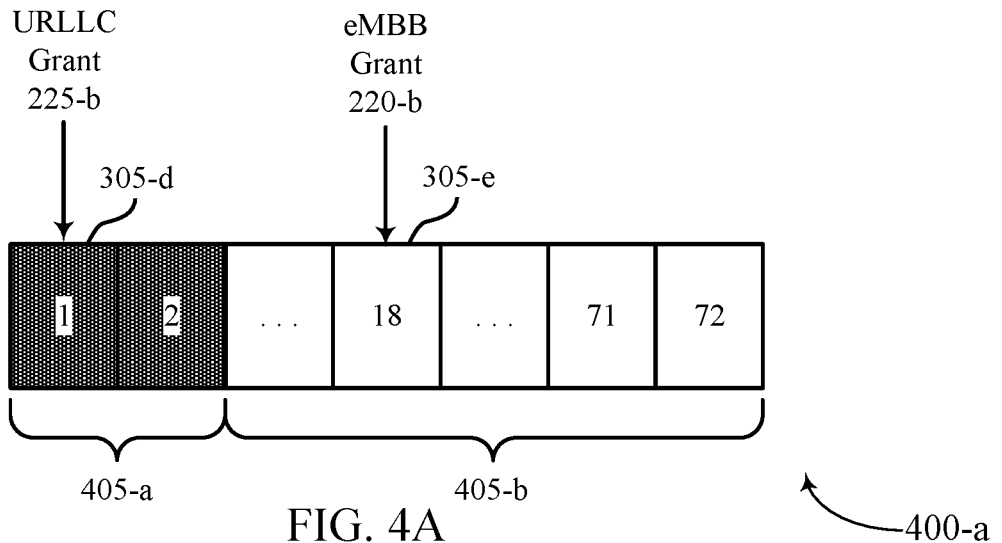
FIGS. 4A and 4B illustrate examples of priority-based BD processes that support priority-based search space categorization in accordance with aspects of the present disclosure.
Figure 4B:
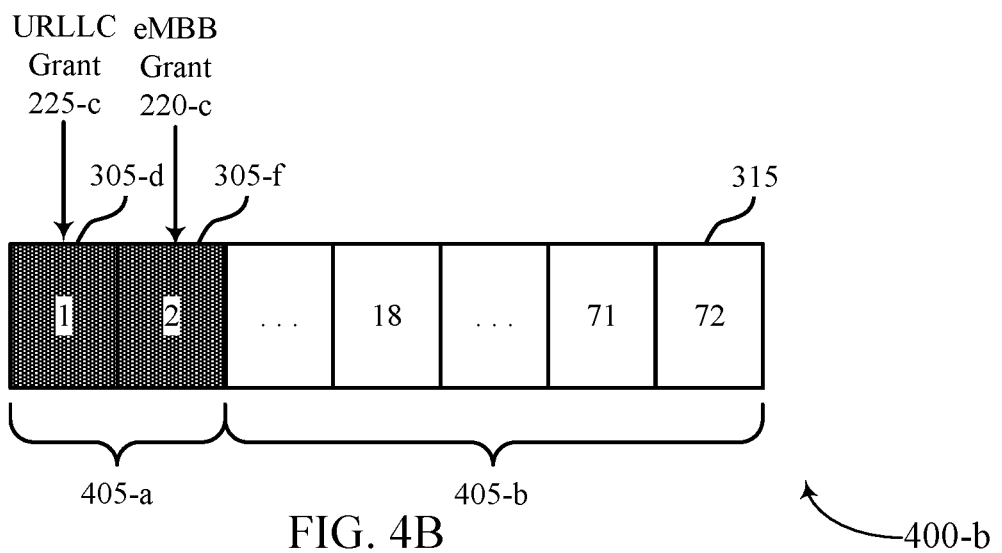

FIGS. 4A and 4B illustrate examples of priority-based BD processes 400-a and 400-b that supports priority-based search space categorization in accordance with aspects of the present disclosure. In some examples, priority-based BD processes 400-a and 400-b may implement aspects of wireless communications system 100. For instance, priority-based BD processes 400-a and 400-b may be implemented by a UE 115 when determining an order in which to decode search spaces.

To enable a UE 115 with limited power, such as described in FIG. 3, to process PDSCHs from an eMBB grant 220 and a URLLC grant 225 before resources for PUCCH feedback elapse, the UE 115 and a serving base station 105 may use an explicit rule. For instance, the UE 115 may receive an indication from the serving base station 105 that indicates a first subset of the search space set over which a UE 115 may decode a URLLC grant 225 or an eMBB grant 220. Alternatively, the UE may decode a URLLC grant 225, but not an eMBB grant 220, over the first subset. In either case, based on the first search space subset, the UE 115 may determine a second subset of the search space set over which the UE 115 may decode eMBB grants 220, but may not decode URLLC grants 225. For instance, the second subset may be any search space of the search space set that is not within the first subset. The UE 115 may map the first subset to BD set 405-*a* and may map the second subset to BD set 405-*b*. As such, the UE 115 may perform BDs 305 on search spaces of the first subset before performing BDs 305 on search spaces of the second subset. In some cases, the UE 115 may use a predetermined subset of the search space set as the first search space set.

Generally, the methods as described herein may be used when eMBB grants 220 and URLLC grants 225 are indistinguishable before decoding, such as described with regards to FIG. 1. To mitigate search space sharing, a UE 115 may identify or determine which search spaces to prioritize. The UE 115 or a serving base station 105 may define explicit rules. For instance, if the UE 115 supports two services or channels with different priorities, the DCI for a high-priority service may be within predetermined search space sets or within a given number of search spaces. The UE 115 may not expect to decode a DCI which schedules a high-priority PDSCH or PUSCH in another search space.

FIG. 4A may represent a scenario in which the UE 115 decodes a URLLC grant 225-*b* in the first subset and decodes an eMBB grant 220-*b* in the second subset. Upon decoding URLLC grant 225-*b* at BD 305-*d* (i.e., BD #1), the UE 115 may begin processing the corresponding PDSCH with processing power X. Meanwhile, the UE 115 may continue performing BDs 305 until the end of BD set 405-*a* and may begin performing BDs 305 at the start of BD set 405-*b*. Once the UE 115 decodes eMBB grant 220-*b* at BD 305-*e* (i.e., BD #18), UE 115 may begin processing the corresponding PDSCH. If the UE 115 has finished processing the PDSCH associated with the URLLC grant 225-*b*, the UE 115 may process the PDSCH associated with eMBB grant 220-*b* with processing power X. If the UE 115 has not finished processing the PDSCH associated with the URLLC grant 225-*b*, the UE 115 may begin processing both the PDSCH associated with the URLLC grant 225-*b* and the PDSCH associated with the eMBB grant 220-*b* simultaneously, and may do so with power βX or lower. However, because the UE 115 began processing the PDSCH associated with the URLLC grant 225-*b* before processing the PDSCH associated with the eMBB grant 220-*b*, the UE 115 may have time to process both before resources for PUCCH feedback elapse.

FIG. 4B may represent a scenario in which the UE 115 decodes a URLLC grant 225-*c* and an eMBB grant 220-*c* in the first subset. Upon decoding the URLLC grant 225-*c* at BD 305-*d* (i.e., BD #1), the UE 115 may begin processing the corresponding PDSCH with processing power X. Upon decoding the eMBB grant at BD 305-*f* (i.e., BD #2) and assuming that the UE 115 has not already finished processing the PDSCH associated with the URLLC grant 225-*c*, the UE 115 may begin processing both PDSCHs simultaneously with power βX or lower. Alternatively, the UE 115 may finish processing the URLLC PDSCH with processing power X first and may process the eMBB PDSCH afterward. In either case, because both the URLLC grant 225-*c* and the eMBB grant 220-*c* were decoded prior to performing BDs 305 for BD set 405-*b*, the UE 115 may have sufficient time to process the PDSCHs associated with both before resources for transmitting PUCCH feedback elapse. In other cases, the UE 115 may decode the eMBB grant 220-*c* before decoding the URLLC grant 225-*c* (e.g., the eMBB grant 220-*c* may be decoded at BD 305-*d* and the URLLC grant 225-*c* may be decoded at BD 305-*f*).

Figure 5:
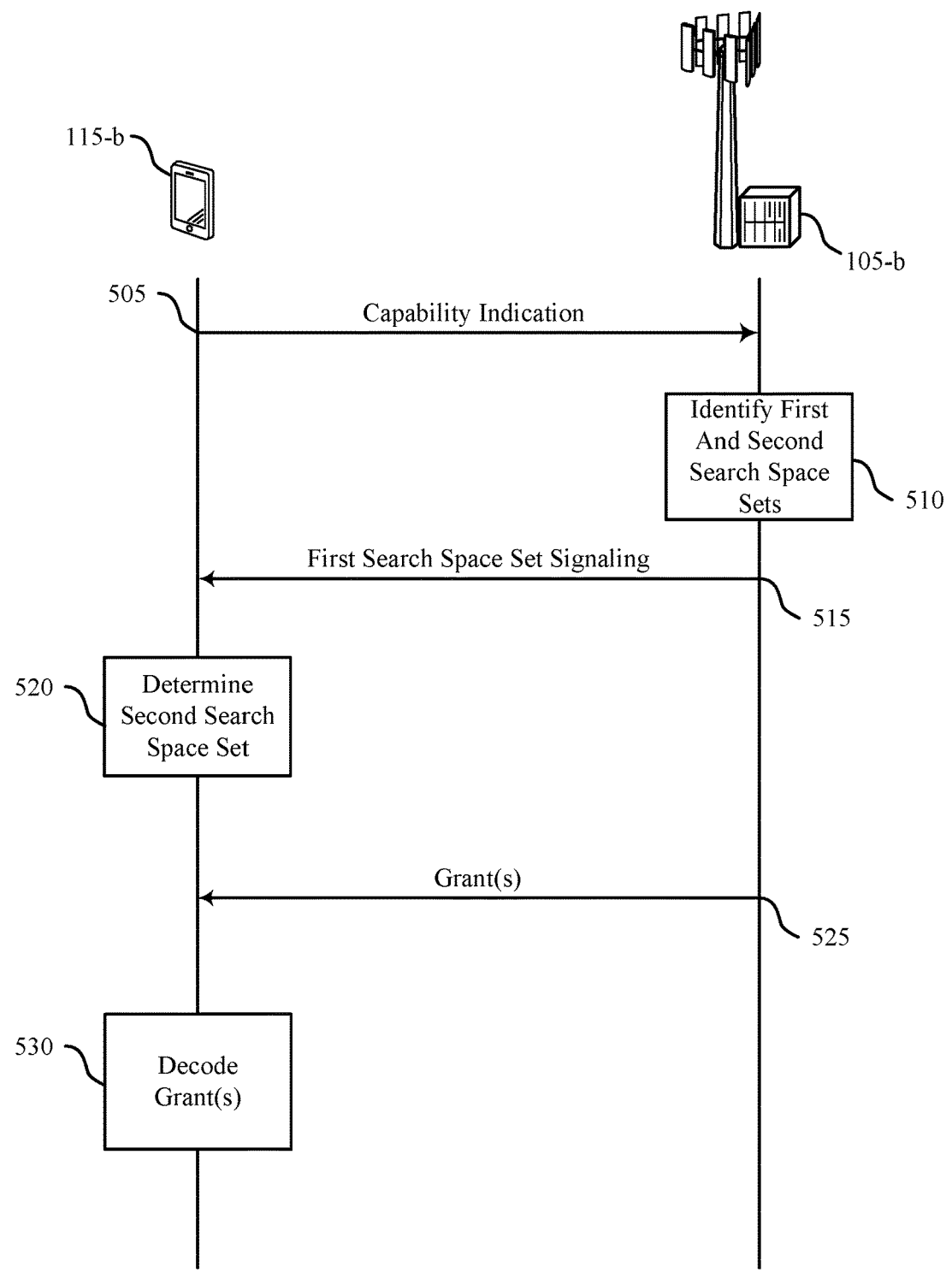
FIG. 5 illustrates an example of a process flow that supports priority-based search space categorization in accordance with aspects of the present disclosure.

FIG. 5 illustrates an example of a process flow 500 that supports priority-based search space categorization in accordance with aspects of the present disclosure. In some examples, process flow 500 may implement aspects of wireless communications system 100. For instance, process flow 500 may include UE 115-*b*, which may be an example of a UE 115 as described with reference to FIG. 1, and base station 105-*b*, which may be an example of a base station 105 as described with reference to FIG. 1.

At 505, UE 115-*b* may transmit an indication that UE 115-*b* is capable of supporting one or more channels of a first priority (e.g., URLLC PDSCH or URLLC PUSCH) and one or more channels of a second priority (e.g., eMBB PDSCH or eMBB PUSCH). The first priority may be higher than the second priority. Base station 105-*b* may receive the indication.

At 510, base station 105-*b* may identify a first search space set in a CORESET that corresponds to grant candidates for scheduling the one or more channels of the first priority and a second search space in the CORESET that corresponds to grant candidates for scheduling the one or more channels of the second priority.

At 515, base station 105-*b* may transmit signaling that indicates the first search space set in the CORESET that corresponds to grant candidates for scheduling the one or more channels of the first priority. In some cases, base station 105-*b* may transmit signaling that indicates a third search space set, of which the first search space set is a subset. Additionally or alternatively, base station 105-*b* may transmit signaling that indicates a format (e.g., a DCI format) for the grant candidates associated with the first search space set. UE 115-*b* may receive the signaling.

At 520, UE 115-*b* may determine a second search space set in the CORESET that corresponds to grant candidates for scheduling the one or more channels of the second priority. In some cases, UE 115-*b* may determine the second search space includes each search space of the third search space set that is not a search space of the first search space set.

At 525, base station 105-*b* may transmit a first grant for scheduling the one or more channels of the first priority over CCEs corresponding to a search space of the first search space set. Additionally or alternatively, base station 105-*b* may transmit a grant for scheduling the one or more channels of the second priority over second CCEs corresponding to a second search space of the first search space set. Additionally or alternatively, base station 105-*b* may transmit a grant for scheduling the one or more channels of the second priority over CCEs corresponding to a first search space of the first search space set. The grants may be DCI. In some cases, base station 105-*b* may refrain from transmitting a grant for scheduling the one or more channels of the first priority over one or more CCEs corresponding to a search space of the second search space set.

At 530, UE 115-*b* may decode, within the search space of the first search space set, the grant for scheduling the one or more channels of the first priority. UE 115-*b* may determine that the grant is for scheduling the one or more channels of the first priority based on an RNTI, a priority indication bit field, or a combination thereof. Additionally or alternatively, UE 115-*b* may decode, within the second search space of the first search space set, the grant for scheduling the one or more channels of the second priority. In some cases, UE 115-*b* may fail to decode, in each search space of the second search space set, a grant for scheduling the one or more channels of the first priority based on the second search space set being associated with the one or more channels of the second priority.

Figure 6:
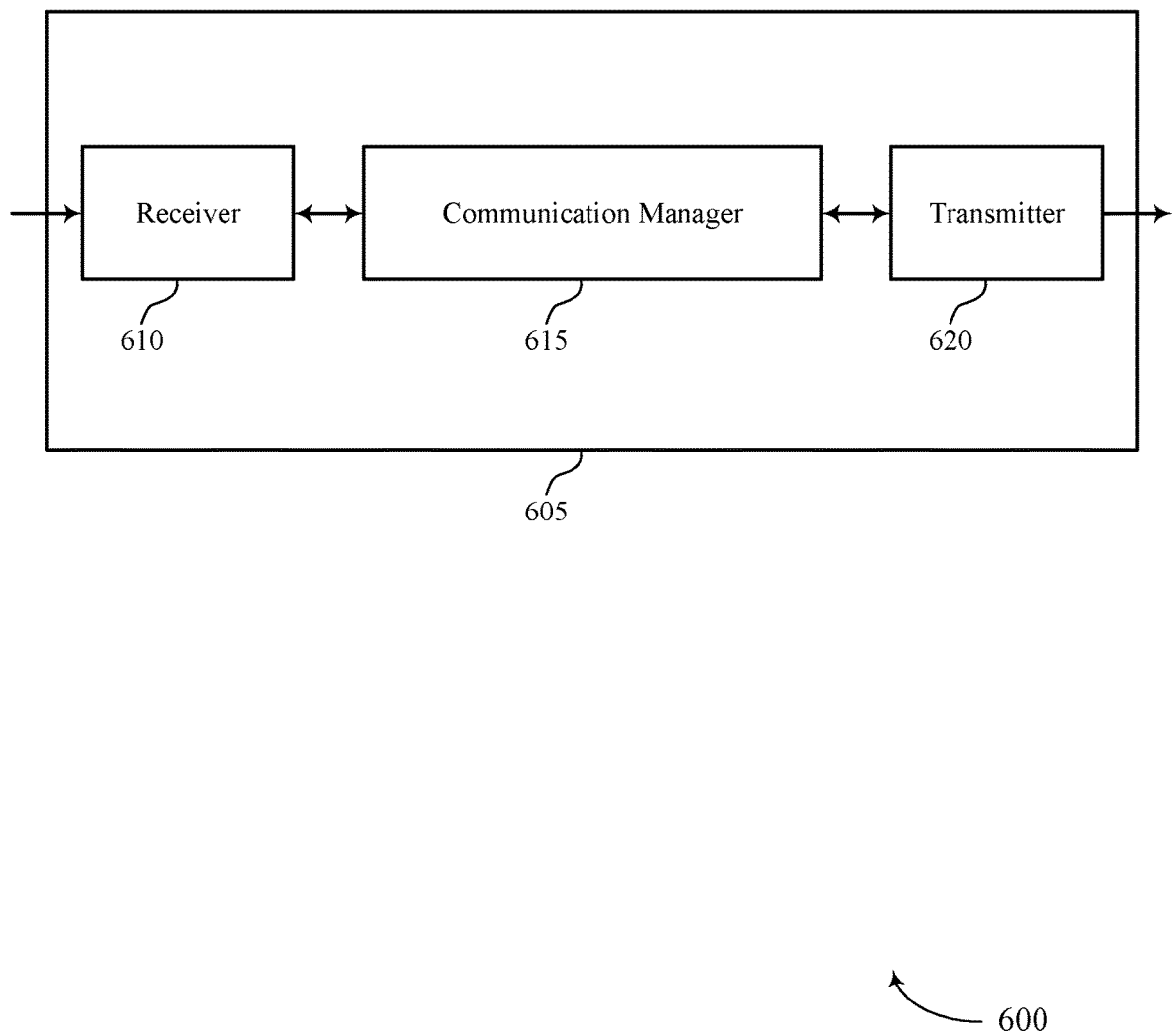
FIGS. 6 and 7 show block diagrams of devices that support priority-based search space categorization in accordance with aspects of the present disclosure.

FIG. 6 shows a block diagram 600 of a device 605 that supports priority-based search space categorization in accordance with aspects of the present disclosure. The device 605 may be an example of aspects of a UE 115 as described herein. The device 605 may include a receiver 610, a communication manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to priority-based search space categorization, etc.). Information may be passed on to other components of the device 605. The receiver 610 may be an example of aspects of the transceiver 915 described with reference to FIG. 9. The receiver 610 may utilize a single antenna or a set of antennas.

The communication manager 615 may receive signaling that indicates a first search space set in a CORESET that corresponds to grant candidates for scheduling one or more channels of a first priority. The communication manager 615 may determine a second search space set in the CORESET that corresponds to grant candidates for scheduling one or more channels of a second priority, where the first priority is higher than the second priority. The communication manager 615 may decode, within a search space of the first search space set, a grant for scheduling the one or more channels of the first priority. The communication manager 615 may be an example of aspects of the communication manager 910 described herein.

The communication manager 615, or its sub-components, may be implemented in hardware, code (e.g., software or firmware) executed by a processor, or any combination thereof. If implemented in code executed by a processor, the functions of the communication manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 615, or its sub-components, may be physically located at various positions, including being distributed such that portions of functions are implemented at different physical locations by one or more physical components. In some examples, the communication manager 615, or its sub-components, may be a separate and distinct component in accordance with various aspects of the present disclosure. In some examples, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 915 described with reference to FIG. 9. The transmitter 620 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to provide assistance for enabling carrier aggregation framework for supporting simultaneous URLLC and eMBB communications. Based on the techniques for enabling carrier aggregation framework for supporting simultaneous URLLC and eMBB communications between the device 605 and the base station, the device 605 may support reduced search space sharing and, therefore, reduced processing power constraints.

As such, the device 605 may increase the likelihood of accurately decoding DCI for URLLC and eMBB communications and, accordingly, may communicate over the channel with a greater likelihood of successful communications. In some examples, based on a greater likelihood of successful communications, the device 605 may more efficiently power a processor or one or more processing units associated with carrier aggregation framework for supporting simultaneous URLLC and eMBB communications, which may enable the device to save power and increase batter life.

Figure 7:
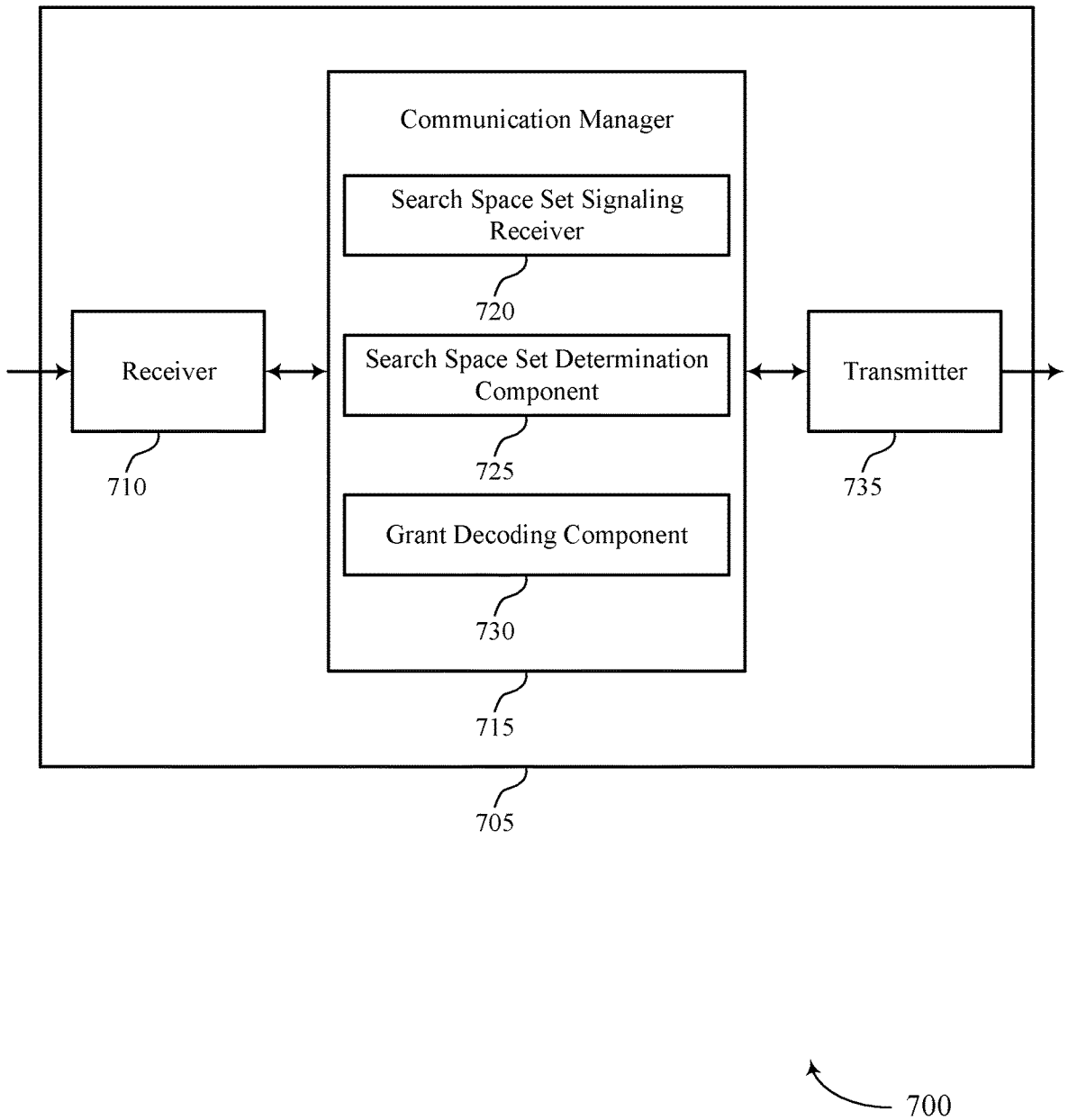

FIG. 7 shows a block diagram 700 of a device 705 that supports priority-based search space categorization in accordance with aspects of the present disclosure. The device 705 may be an example of aspects of a device 605, or a UE 115 as described herein. The device 705 may include a receiver 710, a communication manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to priority-based search space categorization, etc.). Information may be passed on to other components of the device 705. The receiver 710 may be an example of aspects of the transceiver 915 described with reference to FIG. 9. The receiver 710 may utilize a single antenna or a set of antennas.

The communication manager 715 may be an example of aspects of the communication manager 615 as described herein. The communication manager 715 may include a search space set signaling receiver 720, a search space set determination component 725, and a grant decoding component 730. The communication manager 715 may be an example of aspects of the communication manager 910 described herein.

The search space set signaling receiver 720 may receive signaling that indicates a first search space set in a CORESET that corresponds to grant candidates for scheduling one or more channels of a first priority.

The search space set determination component 725 may determine a second search space set in the CORESET that corresponds to grant candidates for scheduling one or more channels of a second priority, where the first priority is higher than the second priority.

The grant decoding component 730 may decode, within a search space of the first search space set, a grant for scheduling the one or more channels of the first priority.

The transmitter 735 may transmit signals generated by other components of the device 705. In some examples, the transmitter 735 may be collocated with a receiver 710 in a transceiver module. For example, the transmitter 735 may be an example of aspects of the transceiver 915 described with reference to FIG. 9. The transmitter 735 may utilize a single antenna or a set of antennas.

Figure 8:
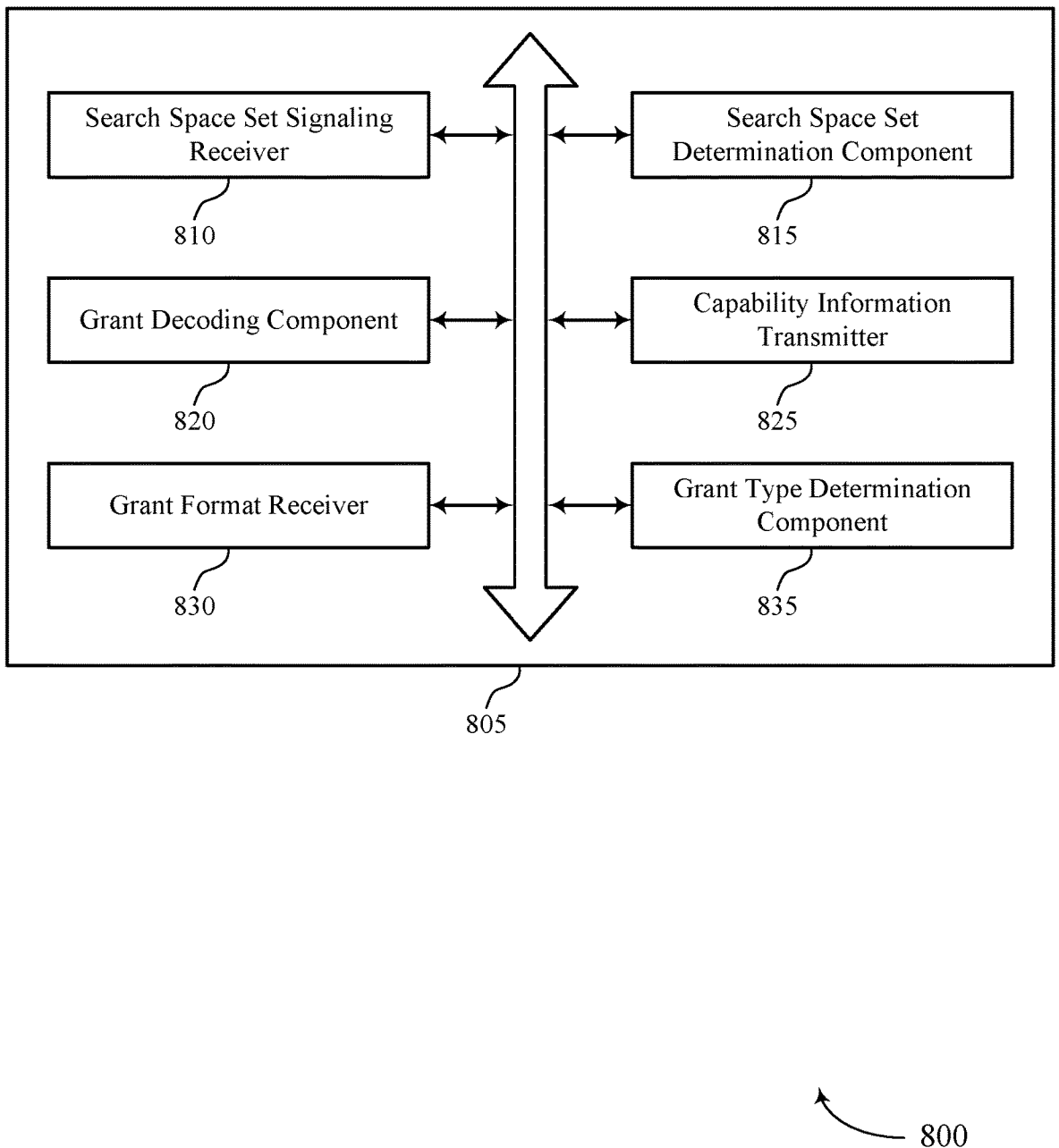
FIG. 8 shows a block diagram of a communication manager that supports priority-based search space categorization in accordance with aspects of the present disclosure.

FIG. 8 shows a block diagram 800 of a communication manager 805 that supports priority-based search space categorization in accordance with aspects of the present disclosure. The communication manager 805 may be an example of aspects of a communication manager 615, a communication manager 715, or a communication manager 910 described herein. The communication manager 805 may include a search space set signaling receiver 810, a search space set determination component 815, a grant decoding component 820, a capability information transmitter 825, a grant format receiver 830, and a grant type determination component 835. Each of these modules may communicate, directly or indirectly, with one another (e.g., via one or more buses).

The search space set signaling receiver 810 may receive signaling that indicates a first search space set in a CORESET that corresponds to grant candidates for scheduling one or more channels of a first priority. In some examples, receiving signaling that indicates a third search space set, where the first search space set is a subset of the third search space set, and where determining the second search space set includes.

The search space set determination component 815 may determine a second search space set in the CORESET that corresponds to grant candidates for scheduling one or more channels of a second priority, where the first priority is higher than the second priority. In some examples, determining that the second search space set includes each search space of the third search space set that is not a search space of the first search space set.

The grant decoding component 820 may decode, within a search space of the first search space set, a grant for scheduling the one or more channels of the first priority. In some examples, the grant decoding component 820 may decode a grant for scheduling the one or more channels of the second priority within a second search space of the first search space set or within a search space of the second search space set. In some examples, the grant decoding component 820 may decode each search space of the second search space set. In some examples, the grant decoding component 820 may fail to decode, in each search space of the second search space set, a grant for scheduling the one or more channels of the first priority based on the second search space set being associated with the one or more channels of the second priority. In some examples, grant decoding component 820 may fail to decode, in each search space of the first search space set, a grant for scheduling the one or more channels of the second priority based on the first search space set being associated with the one or more channels of the first priority.

The capability information transmitter 825 may transmit, to a base station and prior to receiving the signaling, an indication that the UE is capable of supporting the one or more channels of the first priority and the one or more channels of the second priority, where the signaling is received from the base station.

The grant format receiver 830 may receive signaling that indicates a format for DCI corresponding to the grant candidates associated with the first search space set.

The grant type determination component 835 may determine that the grant is for scheduling the one or more channels of the first priority based on a radio network temporary identifier associated with the grant, a priority indication bit field associated with the grant, or a combination thereof.

Figure 9:
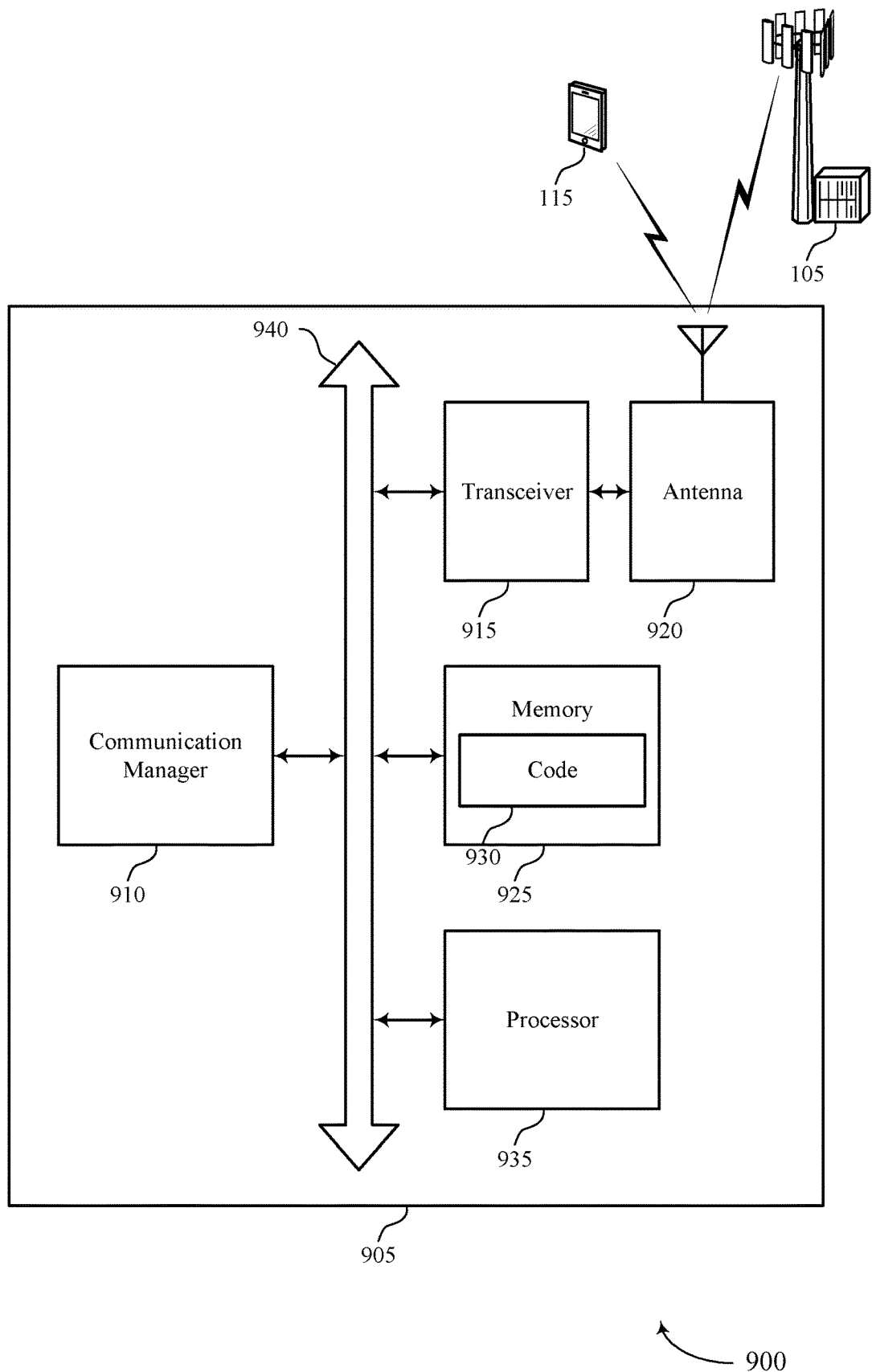
FIG. 9 shows a diagram of a system including a device that supports priority-based search space categorization in accordance with aspects of the present disclosure.

FIG. 9 shows a diagram of a system 900 including a device 905 that supports priority-based search space categorization in accordance with aspects of the present disclosure. The device 905 may be an example of or include the components of device 605, device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The communication manager 910 may receive signaling that indicates a first search space set in a CORESET that corresponds to grant candidates for scheduling one or more channels of a first priority. The communication manager 910 may determine a second search space set in the CORESET that corresponds to grant candidates for scheduling one or more channels of a second priority, where the first priority is higher than the second priority. The communication manager 910 may decode, within a search space of the first search space set, a grant for scheduling the one or more channels of the first priority.

The transceiver 915 may communicate bi-directionally, via one or more antennas, wired, or wireless links as described herein. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920, which may be capable of concurrently transmitting or receiving multiple wireless transmissions.

The memory 925 may include random-access memory (RAM) and read-only memory (ROM). The memory 925 may store computer-readable, computer-executable code 930 including instructions that, when executed, cause the processor to perform various functions described herein. In some cases, the memory 925 may contain, among other things, a basic input/output system (BIOS) which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting priority-based search space categorization).

Figure 10:
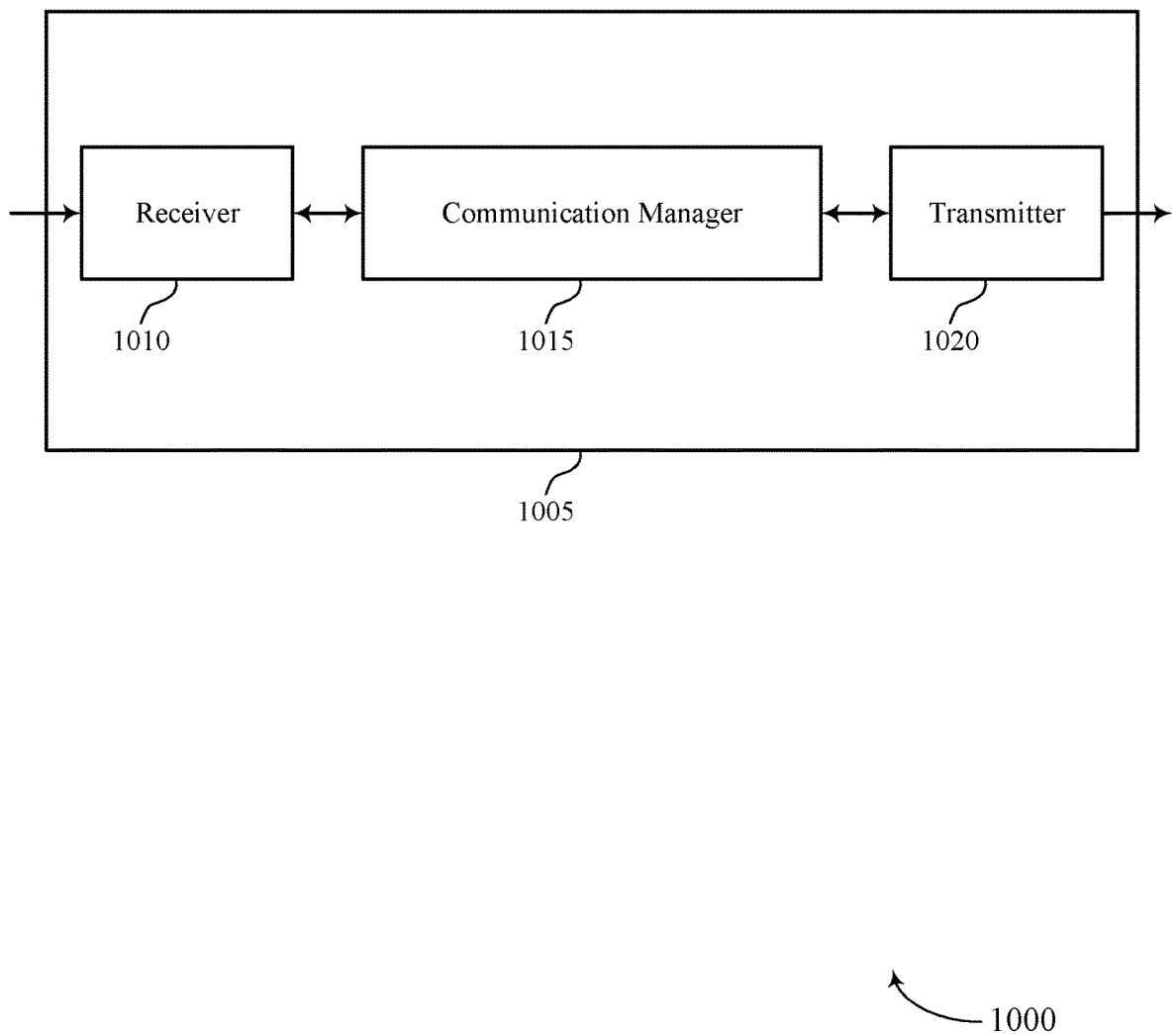
FIGS. 10 and 11 show block diagrams of devices that support priority-based search space categorization in accordance with aspects of the present disclosure.

FIG. 10 shows a block diagram 1000 of a device 1005 that supports priority-based search space categorization in accordance with aspects of the present disclosure. The device 1005 may be an example of aspects of a base station 105 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to priority-based search space categorization, etc.). Information may be passed on to other components of the device 1005. The receiver 1010 may be an example of aspects of the transceiver 1320 described with reference to FIG. 13. The receiver 1010 may utilize a single antenna or a set of antennas.

The communication manager 1015 may receive, from a UE, an indication that the UE is capable of supporting one or more channels of a first priority and one or more channels of a second priority, where the first priority is higher than the second priority. The communication manager 1015 may identify a first search space set in a control-resource set (CORESET) that corresponds to grant candidates for scheduling the one or more channels of the first priority and a second search space set in the CORESET that corresponds to grant candidates for scheduling the one or more channels of the second priority. The communication manager 1015 may transmit, to the UE, a grant for scheduling the one or more channels of the first priority over control channel elements corresponding to a search space of the first search space set. The communication manager 1015 may be an example of aspects of the communication manager 1310 described herein.

The communication manager 1015, or its sub-components, may be implemented in hardware, code (e.g., software or firmware) executed by a processor, or any combination thereof. If implemented in code executed by a processor, the functions of the communication manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communication manager 1015, or its sub-components, may be physically located at various positions, including being distributed such that portions of functions are implemented at different physical locations by one or more physical components. In some examples, the communication manager 1015, or its sub-components, may be a separate and distinct component in accordance with various aspects of the present disclosure. In some examples, the communication manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
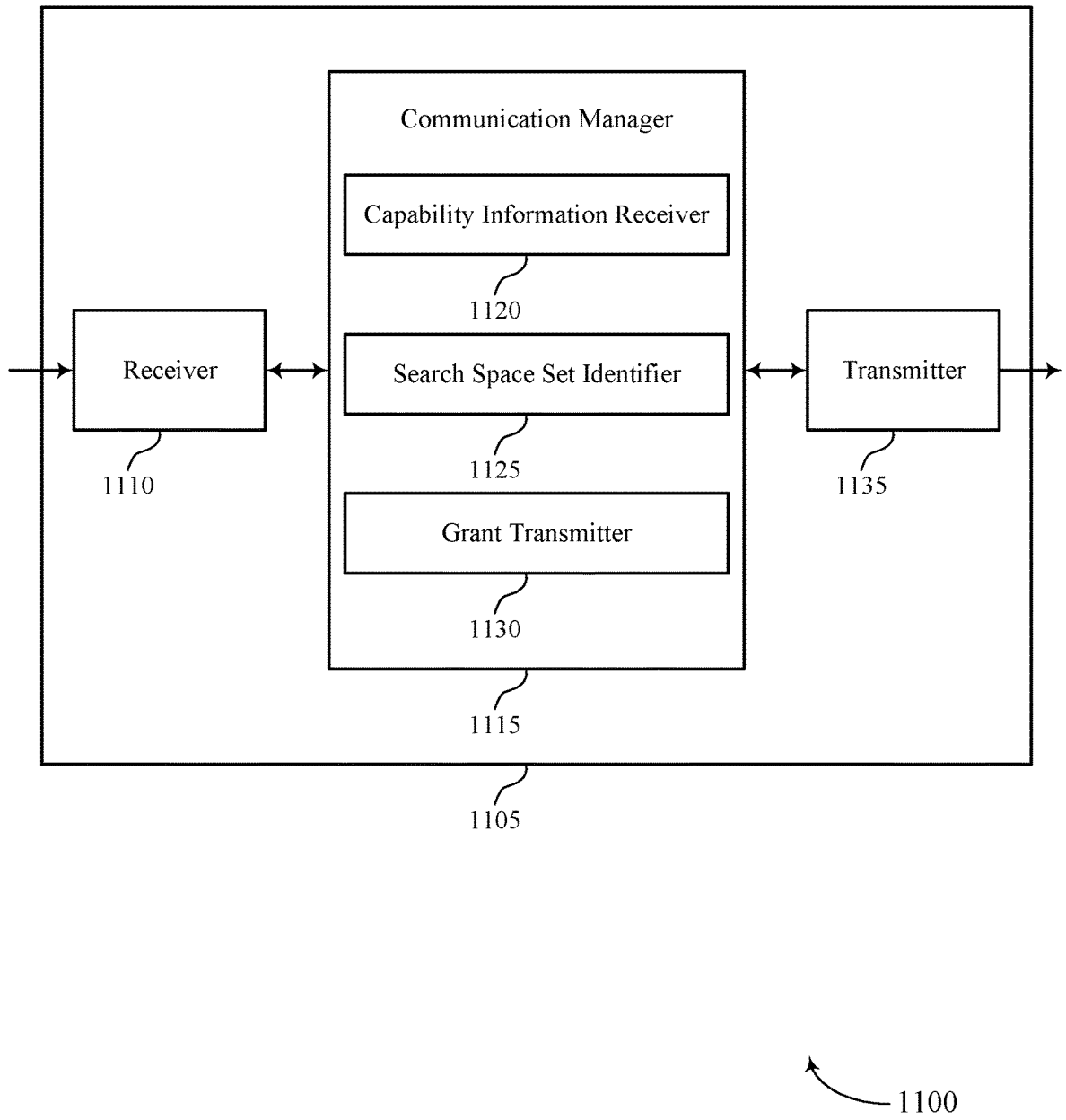

FIG. 11 shows a block diagram 1100 of a device 1105 that supports priority-based search space categorization in accordance with aspects of the present disclosure. The device 1105 may be an example of aspects of a device 1005, or a base station 105 as described herein. The device 1105 may include a receiver 1110, a communication manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to priority-based search space categorization, etc.). Information may be passed on to other components of the device 1105. The receiver 1110 may be an example of aspects of the transceiver 1320 described with reference to FIG. 13. The receiver 1110 may utilize a single antenna or a set of antennas.

The communication manager 1115 may be an example of aspects of the communication manager 1015 as described herein. The communication manager 1115 may include a capability information receiver 1120, a search space set identifier 1125, and a grant transmitter 1130. The communication manager 1115 may be an example of aspects of the communication manager 1310 described herein.

The capability information receiver 1120 may receive, from a UE, an indication that the UE is capable of supporting one or more channels of a first priority and one or more channels of a second priority, where the first priority is higher than the second priority.

The search space set identifier 1125 may identify a first search space set in a CORESET that corresponds to grant candidates for scheduling the one or more channels of the first priority and a second search space set in the CORESET that corresponds to grant candidates for scheduling the one or more channels of the second priority.

The grant transmitter 1130 may transmit, to the UE, a grant for scheduling the one or more channels of the first priority over control channel elements corresponding to a search space of the first search space set.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
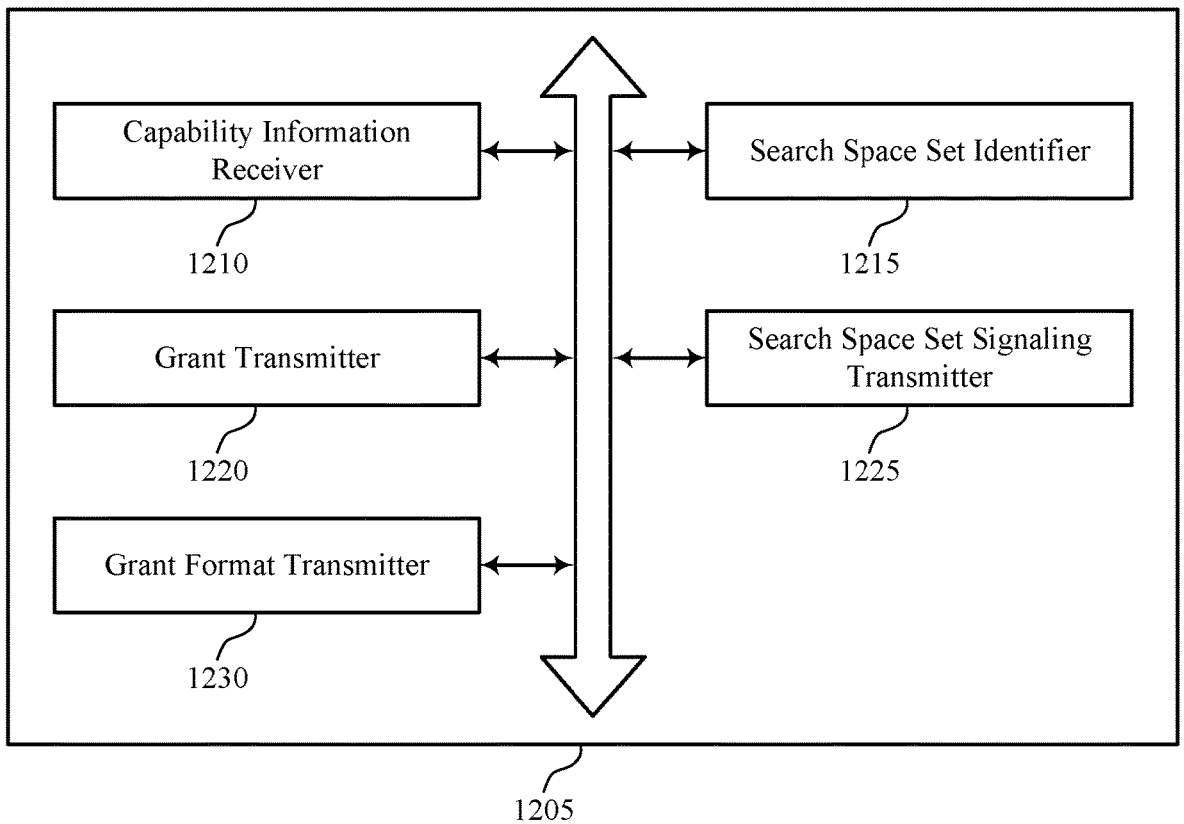
FIG. 12 shows a block diagram of a communication manager that supports priority-based search space categorization in accordance with aspects of the present disclosure.

FIG. 12 shows a block diagram 1200 of a communication manager 1205 that supports priority-based search space categorization in accordance with aspects of the present disclosure. The communication manager 1205 may be an example of aspects of a communication manager 1015, a communication manager 1115, or a communication manager 1310 described herein. The communication manager 1205 may include a capability information receiver 1210, a search space set identifier 1215, a grant transmitter 1220, a search space set signaling transmitter 1225, and a grant format transmitter 1230. Each of these modules may communicate, directly or indirectly, with one another (e.g., via one or more buses).

The capability information receiver 1210 may receive, from a UE, an indication that the UE is capable of supporting one or more channels of a first priority and one or more channels of a second priority, where the first priority is higher than the second priority.

The search space set identifier 1215 may identify a first search space set in a CORESET that corresponds to grant candidates for scheduling the one or more channels of the first priority and a second search space set in the CORESET that corresponds to grant candidates for scheduling the one or more channels of the second priority.

The grant transmitter 1220 may transmit, to the UE, a grant for scheduling the one or more channels of the first priority over control channel elements corresponding to a search space of the first search space set. In some examples, the grant transmitter 1220 may transmit, to the UE, a grant for scheduling the one or more channels of the second priority over second control channel elements corresponding to a second search space of the first search space set based on the first search space set being associated with the first priority. In some examples, the grant transmitter 1220 may refrain from transmitting, to the UE, a second grant for scheduling the one or more channels of the first priority over one or more control channel elements corresponding to a search space of the second search space set based on the second search space set being associated with the one or more channels of the second priority. In some cases, the grant includes DCI.

The search space set signaling transmitter 1225 may transmit, to the UE, signaling indicating the first search space set. In some examples, the search space set signaling transmitter 1225 may transmit, to the UE, signaling indicating a third search space set, where the first search space set is a subset of the third search space set, and where each search space of the third search space set that is not a search space of the first search space set is a search space of the second search space set.

The grant format transmitter 1230 may transmit, to the UE, signaling that indicates a format for the grant candidates associated with the first search space set.

Figure 13:
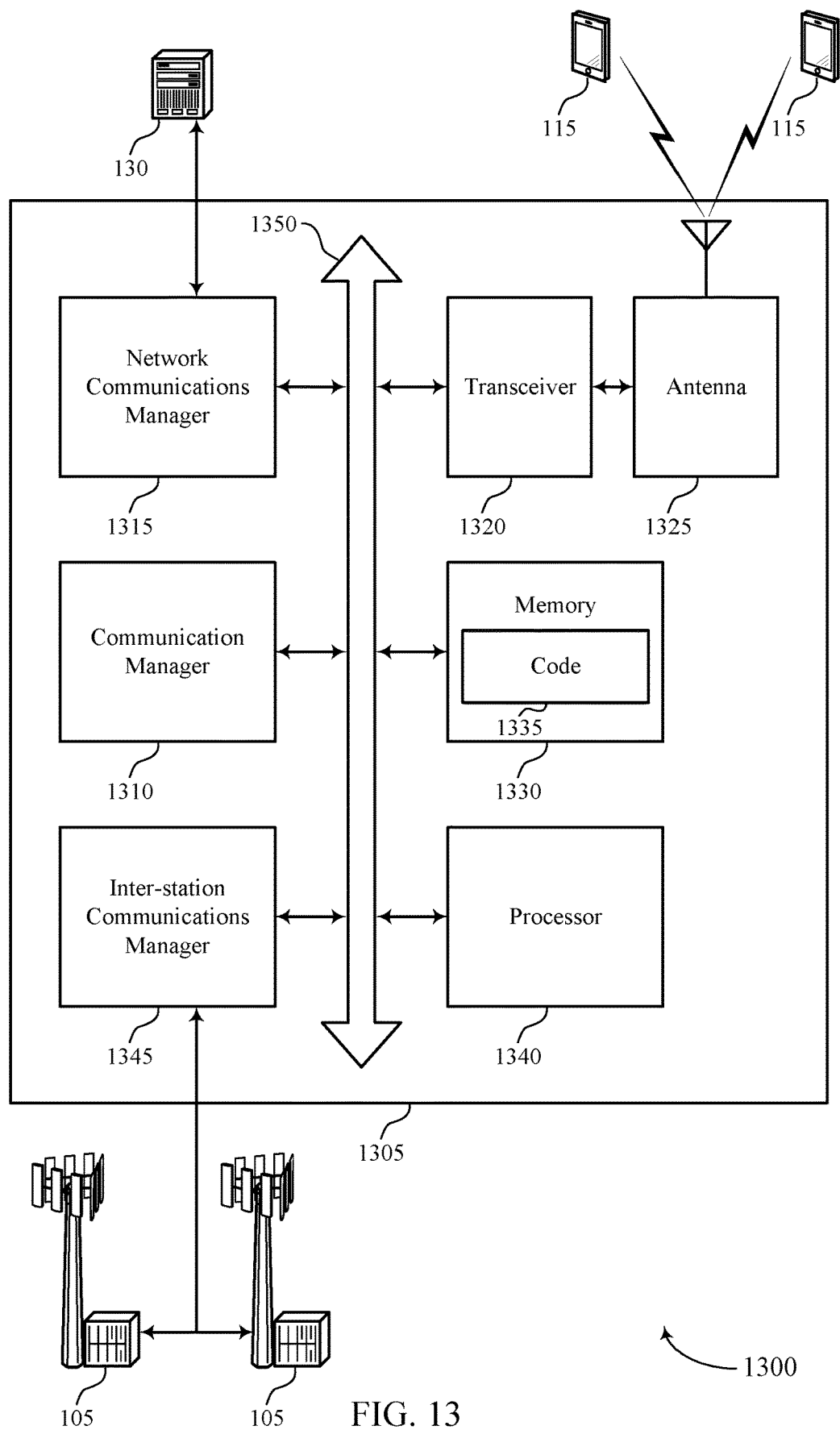
FIG. 13 shows a diagram of a system including a device that supports priority-based search space categorization in accordance with aspects of the present disclosure.

FIG. 13 shows a diagram of a system 1300 including a device 1305 that supports priority-based search space categorization in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communication manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communication manager 1310 may receive, from a UE, an indication that the UE is capable of supporting one or more channels of a first priority and one or more channels of a second priority, where the first priority is higher than the second priority. The communication manager 1310 may identify a first search space set in a CORESET that corresponds to grant candidates for scheduling the one or more channels of the first priority and a second search space set in the CORESET that corresponds to grant candidates for scheduling the one or more channels of the second priority. The communication manager 1310 may transmit, to the UE, a grant for scheduling the one or more channels of the first priority over control channel elements corresponding to a search space of the first search space set.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting priority-based search space categorization).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
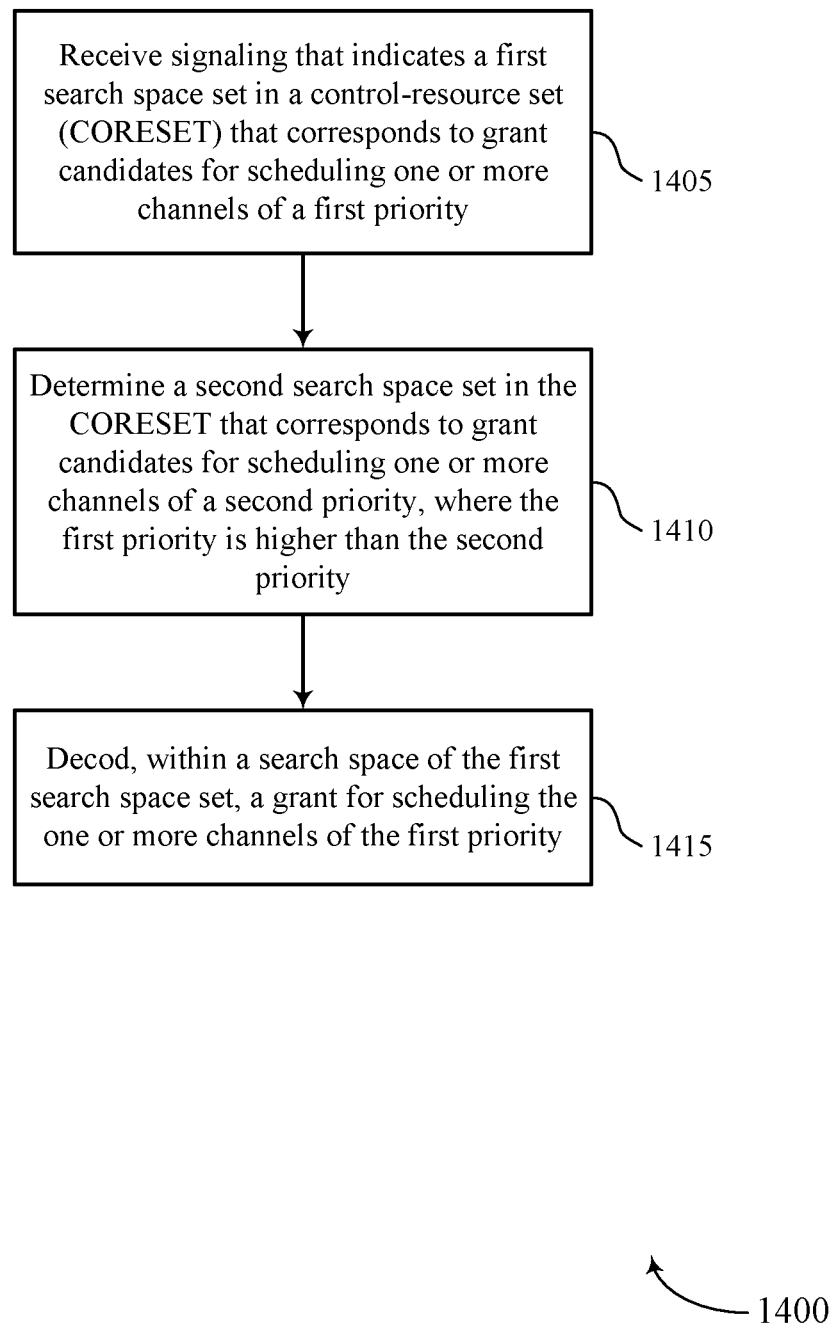
FIGS. 14 through 19 show flowcharts illustrating methods that support priority-based search space categorization in accordance with aspects of the present disclosure.

FIG. 14 shows a flowchart illustrating a method 1400 that supports priority-based search space categorization in accordance with aspects of the present disclosure. The operations of method 1400 may be implemented by a UE 115 or its components as described herein. For example, the operations of method 1400 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1405, the UE may receive signaling that indicates a first search space set in a CORESET that corresponds to grant candidates for scheduling one or more channels of a first priority. The operations of 1405 may be performed according to the methods described herein. In some examples, aspects of the operations of 1405 may be performed by a search space set signaling receiver as described with reference to FIGS. 6 through 9.

At 1410, the UE may determine a second search space set in the CORESET that corresponds to grant candidates for scheduling one or more channels of a second priority, where the first priority is higher than the second priority. The operations of 1410 may be performed according to the methods described herein. In some examples, aspects of the operations of 1410 may be performed by a search space set determination component as described with reference to FIGS. 6 through 9.

At 1415, the UE may decode, within a search space of the first search space set, a grant for scheduling the one or more channels of the first priority. The operations of 1415 may be performed according to the methods described herein. In some examples, aspects of the operations of 1415 may be performed by a grant decoding component as described with reference to FIGS. 6 through 9.

Figure 15:
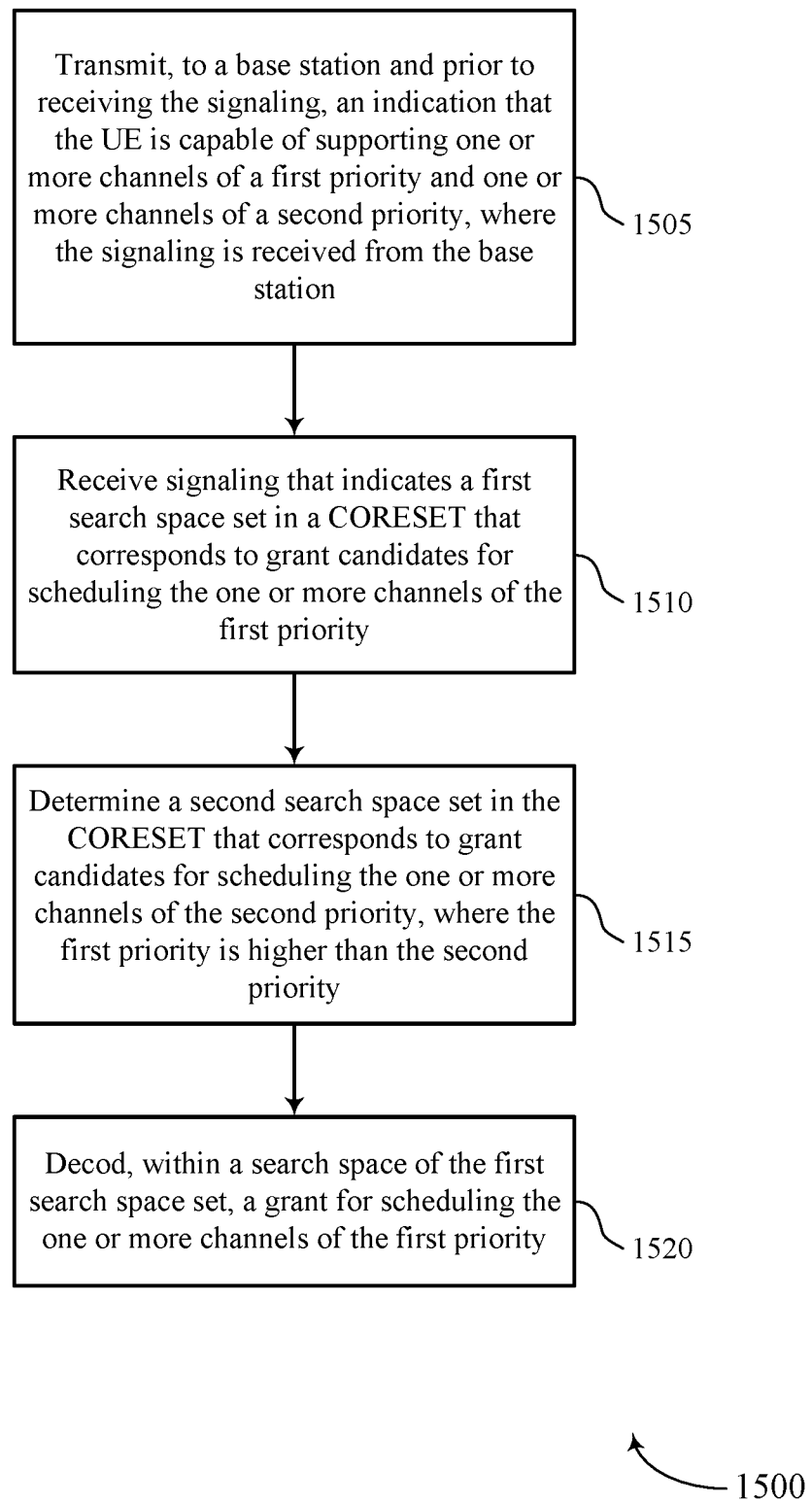

FIG. 15 shows a flowchart illustrating a method 1500 that supports priority-based search space categorization in accordance with aspects of the present disclosure. The operations of method 1500 may be implemented by a UE 115 or its components as described herein. For example, the operations of method 1500 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1505, the UE may transmit, to a base station and prior to receiving the signaling, an indication that the UE is capable of supporting one or more channels of a first priority and one or more channels of a second priority, where the signaling is received from the base station. The operations of 1505 may be performed according to the methods described herein. In some examples, aspects of the operations of 1505 may be performed by a capability information transmitter as described with reference to FIGS. 6 through 9.

At 1510, the UE may receive signaling that indicates a first search space set in a CORESET that corresponds to grant candidates for scheduling the one or more channels of the first priority. The operations of 1510 may be performed according to the methods described herein. In some examples, aspects of the operations of 1510 may be performed by a search space set signaling receiver as described with reference to FIGS. 6 through 9.

At 1515, the UE may determine a second search space set in the CORESET that corresponds to grant candidates for scheduling the one or more channels of the second priority, where the first priority is higher than the second priority. The operations of 1515 may be performed according to the methods described herein. In some examples, aspects of the operations of 1515 may be performed by a search space set determination component as described with reference to FIGS. 6 through 9.

At 1520, the UE may decode, within a search space of the first search space set, a grant for scheduling the one or more channels of the first priority. The operations of 1520 may be performed according to the methods described herein. In some examples, aspects of the operations of 1520 may be performed by a grant decoding component as described with reference to FIGS. 6 through 9.

Figure 16:
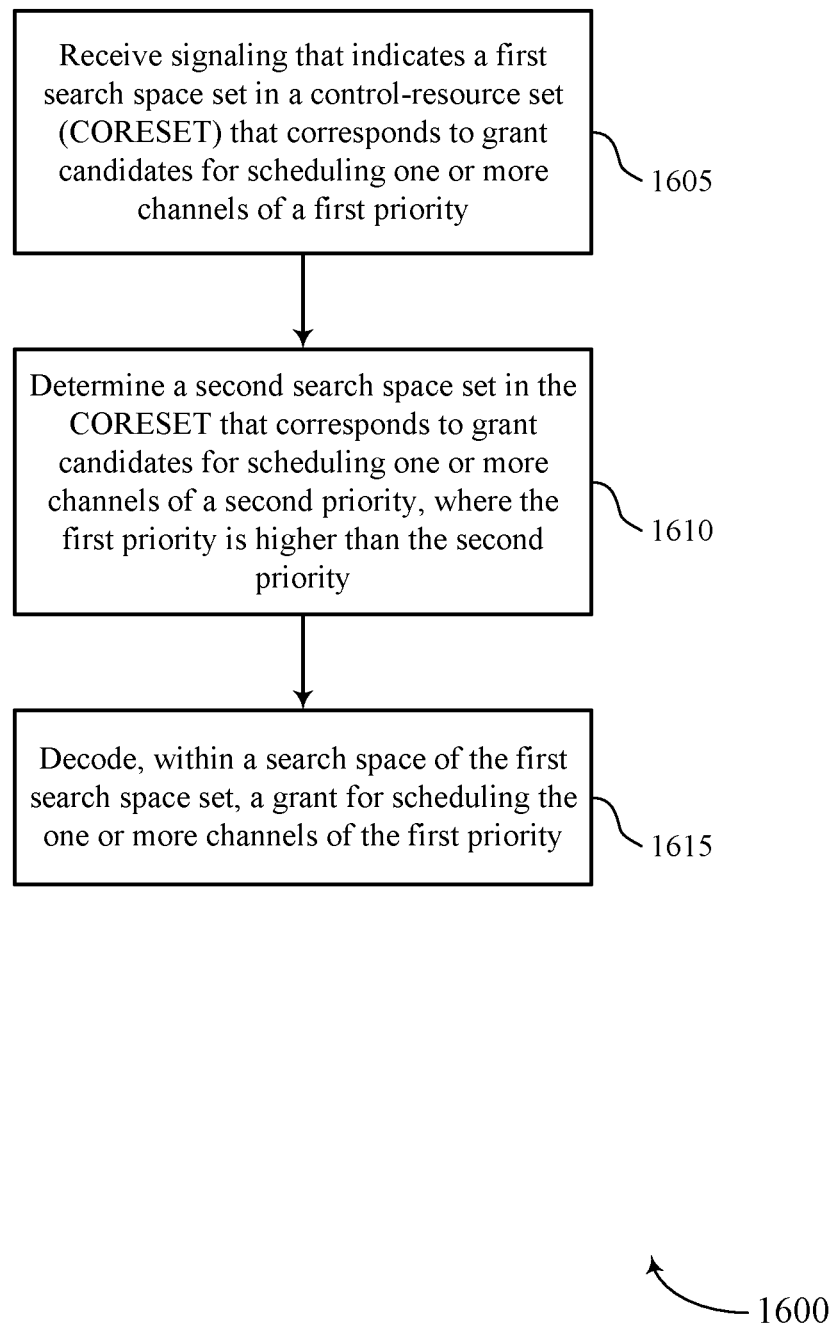

FIG. 16 shows a flowchart illustrating a method 1600 that supports priority-based search space categorization in accordance with aspects of the present disclosure. The operations of method 1600 may be implemented by a UE 115 or its components as described herein. For example, the operations of method 1600 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1605, the UE may receive signaling that indicates a first search space set in a CORESET that corresponds to grant candidates for scheduling one or more channels of a first priority. The operations of 1605 may be performed according to the methods described herein. In some examples, aspects of the operations of 1605 may be performed by a search space set signaling receiver as described with reference to FIGS. 6 through 9.

At 1610, the UE may determine a second search space set in the CORESET that corresponds to grant candidates for scheduling one or more channels of a second priority, where the first priority is higher than the second priority. The operations of 1610 may be performed according to the methods described herein. In some examples, aspects of the operations of 1610 may be performed by a search space set determination component as described with reference to FIGS. 6 through 9.

At 1615, the UE may decode, within a search space of the first search space set, a grant for scheduling the one or more channels of the first priority. The operations of 1615 may be performed according to the methods described herein. In some examples, aspects of the operations of 1615 may be performed by a grant decoding component as described with reference to FIGS. 6 through 9.

Figure 17:
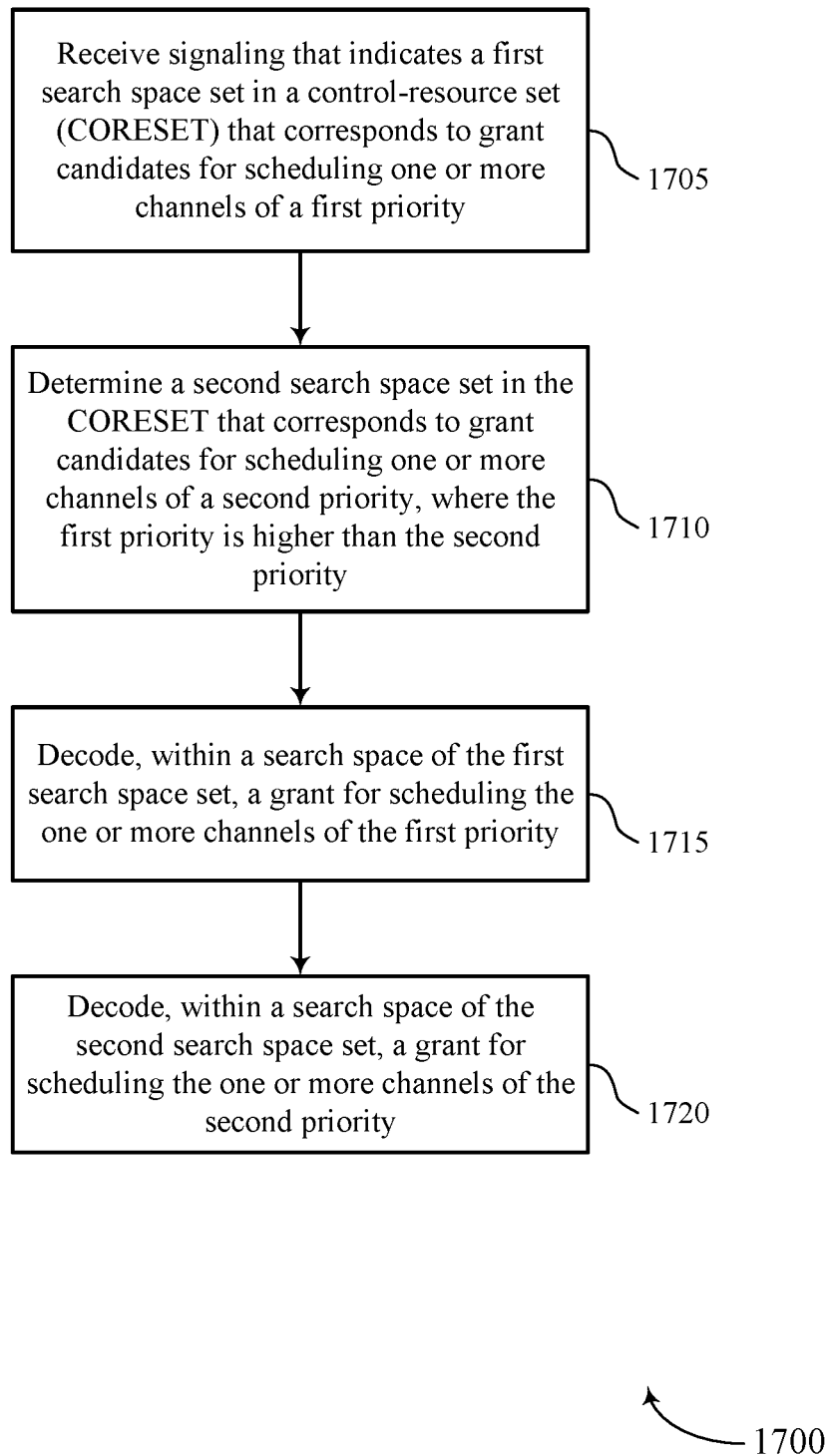

FIG. 17 shows a flowchart illustrating a method 1700 that supports priority-based search space categorization in accordance with aspects of the present disclosure. The operations of method 1700 may be implemented by a UE 115 or its components as described herein. For example, the operations of method 1700 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1705, the UE may receive signaling that indicates a first search space set in a CORESET that corresponds to grant candidates for scheduling one or more channels of a first priority. The operations of 1705 may be performed according to the methods described herein. In some examples, aspects of the operations of 1705 may be performed by a search space set signaling receiver as described with reference to FIGS. 6 through 9.

At 1710, the UE may determine a second search space set in the CORESET that corresponds to grant candidates for scheduling one or more channels of a second priority, where the first priority is higher than the second priority. The operations of 1710 may be performed according to the methods described herein. In some examples, aspects of the operations of 1710 may be performed by a search space set determination component as described with reference to FIGS. 6 through 9.

At 1715, the UE may decode, within a search space of the first search space set, a grant for scheduling the one or more channels of the first priority. The operations of 1715 may be performed according to the methods described herein. In some examples, aspects of the operations of 1715 may be performed by a grant decoding component as described with reference to FIGS. 6 through 9.

At 1720, the UE may decode, within a search space of the second search space set, a grant for scheduling the one or more channels of the second priority. The operations of 1720 may be performed according to the methods described herein. In some examples, aspects of the operations of 1720 may be performed by a grant decoding component as described with reference to FIGS. 6 through 9.

Figure 18:
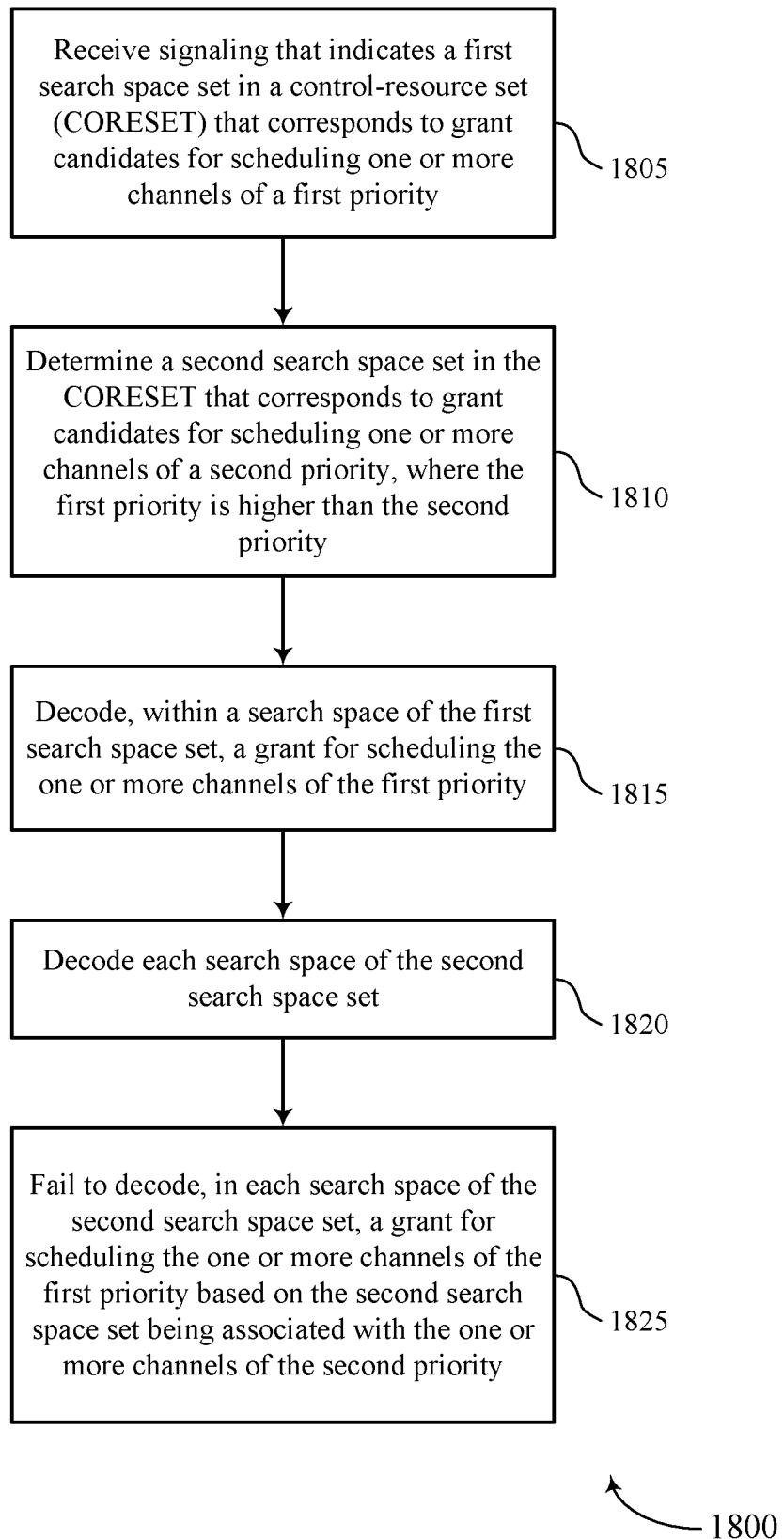

FIG. 18 shows a flowchart illustrating a method 1800 that supports priority-based search space categorization in accordance with aspects of the present disclosure. The operations of method 1800 may be implemented by a UE 115 or its components as described herein. For example, the operations of method 1800 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1805, the UE may receive signaling that indicates a first search space set in a CORESET that corresponds to grant candidates for scheduling one or more channels of a first priority. The operations of 1805 may be performed according to the methods described herein. In some examples, aspects of the operations of 1805 may be performed by a search space set signaling receiver as described with reference to FIGS. 6 through 9.

At 1810, the UE may determine a second search space set in the CORESET that corresponds to grant candidates for scheduling one or more channels of a second priority, where the first priority is higher than the second priority. The operations of 1810 may be performed according to the methods described herein. In some examples, aspects of the operations of 1810 may be performed by a search space set determination component as described with reference to FIGS. 6 through 9.

At 1815, the UE may decode, within a search space of the first search space set, a grant for scheduling the one or more channels of the first priority. The operations of 1815 may be performed according to the methods described herein. In some examples, aspects of the operations of 1815 may be performed by a grant decoding component as described with reference to FIGS. 6 through 9.

At 1820, the UE may decode each search space of the second search space set. The operations of 1820 may be performed according to the methods described herein. In some examples, aspects of the operations of 1820 may be performed by a grant decoding component as described with reference to FIGS. 6 through 9.

At 1825, the UE may fail to decode, in each search space of the second search space set, a grant for scheduling the one or more channels of the first priority based on the second search space set being associated with the one or more channels of the second priority. The operations of 1825 may be performed according to the methods described herein. In some examples, aspects of the operations of 1825 may be performed by a grant decoding component as described with reference to FIGS. 6 through 9.

Figure 19:
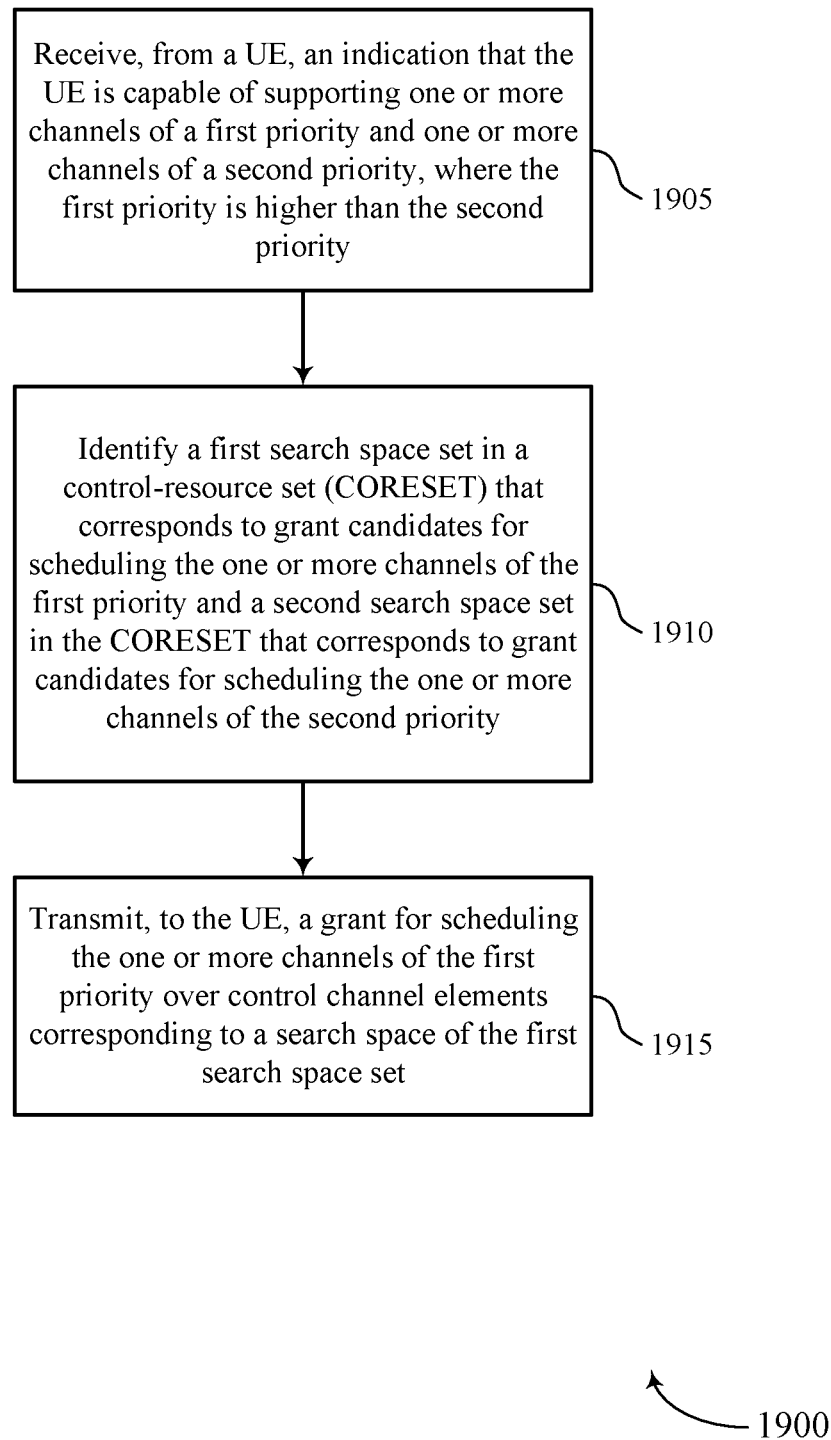

FIG. 19 shows a flowchart illustrating a method 1900 that supports priority-based search space categorization in accordance with aspects of the present disclosure. The operations of method 1900 may be implemented by a base station 105 or its components as described herein. For example, the operations of method 1900 may be performed by a communication manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 1905, the base station may receive, from a UE, an indication that the UE is capable of supporting one or more channels of a first priority and one or more channels of a second priority, where the first priority is higher than the second priority. The operations of 1905 may be performed according to the methods described herein. In some examples, aspects of the operations of 1905 may be performed by a capability information receiver as described with reference to FIGS. 10 through 13.

At 1910, the base station may identify a first search space set in a CORESET that corresponds to grant candidates for scheduling the one or more channels of the first priority and a second search space set in the CORESET that corresponds to grant candidates for scheduling the one or more channels of the second priority. The operations of 1910 may be performed according to the methods described herein. In some examples, aspects of the operations of 1910 may be performed by a search space set identifier as described with reference to FIGS. 10 through 13.

At 1915, the base station may transmit, to the UE, a grant for scheduling the one or more channels of the first priority over control channel elements corresponding to a search space of the first search space set. The operations of 1915 may be performed according to the methods described herein. In some examples, aspects of the operations of 1915 may be performed by a grant transmitter as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like).

An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving signaling that indicates a first search space set in a control-resource set (CORESET) that corresponds to grant candidates for scheduling one or more first channels of a first priority;
   determining a second search space set in the CORESET that corresponds to grant candidates for scheduling the one or more first channels of the first priority and one or more second channels of a second priority, wherein the first search space set corresponds to grant candidates for scheduling the one or more first channels of the first priority based at least in part on the first priority being higher than the second priority; and
   performing blind decoding, within a search space of the first search space set, for a grant scheduling the one or more first channels of the first priority before performing blind decoding for the grant in the second search space set in accordance with the first priority being higher than the second priority.

2. The method of claim 1, further comprising:
   transmitting, to a base station and prior to receiving the signaling, an indication that the UE is capable of supporting the one or more first channels of the first priority and the one or more second channels of the second priority, wherein the signaling is received from the base station.

3. The method of claim 1, further comprising:
   receiving signaling that indicates a third search space set, wherein the first search space set is a subset of the third search space set, and wherein the second search space set comprises each search space of the third search space set that is not a search space of the first search space set.

4. The method of claim 1, further comprising:
   receiving signaling that indicates a format for downlink control information (DCI) corresponding to the grant candidates associated with the first search space set.

5. The method of claim 1, wherein the second search space set further corresponds to additional grant candidates for scheduling the one or more second channels of the second priority, and further comprising performing blind decoding for a grant scheduling the one or more second channels of the second priority within a search space of the second search space set.

6. The method of claim 1, further comprising:
   performing blind decoding in each search space of the first search space set; and
   failing to decode, in each search space of the first search space set, a grant for scheduling the one or more second channels of the second priority based at least in part on the first search space set being associated with the one or more first channels of the first priority.

7. The method of claim 1, further comprising:
   determining that the grant is for scheduling the one or more first channels of the first priority based at least in part on a radio network temporary identifier associated with the grant, a priority indication bit field associated with the grant, or a combination thereof.

8. The method of claim 1, wherein no search spaces of the first search space set correspond to additional grant candidates for scheduling the one or more second channels of the second priority.

9. The method of claim 1, further comprising:
   performing blind decoding in each search space of the second search space set; and
   failing to decode, in each search space of the second search space set, a grant for scheduling the one or more first channels of the first priority based at least in part on the second search space set being associated with the one or more second channels of the second priority.

10. The method of claim 1, wherein the grant candidates for scheduling the one or more first channels of the first priority and the grant candidates for scheduling the one or more second channels of the second priority are physical downlink control channel candidates.

11. The method of claim 1, wherein the one or more first channels of the first priority are associated with ultra-reliable low-latency communications (URLLC) and the one or more second channels of the second priority are associated with enhanced mobile broadband (eMBB).

12. The method of claim 1, wherein a blind decoding order of the grant candidates for scheduling the one or more first channels of the first priority and the grant candidates for scheduling the one or more first channels of the second priority is based at least on part on the first priority and the second priority.

13. The method of claim 1, wherein the UE decodes the grant scheduling the one or more first channels of the first priority within one, but not both, of the first search space set or the second search space set.

14. The method of claim 1, wherein:
   the second search space set further corresponds to additional grant candidates for scheduling the one or more second channels of the second priority,
   the grant candidates for scheduling the one or more first channels of the first priority and the grant candidates for scheduling the one or more first channels of the second priority are each associated with a processing timeline, and
   the UE begins decoding the scheduled one or more first channels of the first priority before the scheduled one or more first channels of the second priority when two grants are detected via the blind decoding.

15. A method for wireless communications, comprising:
receiving, from a user equipment (UE), an indication that the UE is capable of supporting one or more first channels of a first priority and one or more second channels of a second priority, wherein the first priority is higher than the second priority;
identifying a first search space set in a control-resource set (CORESET) that corresponds to grant candidates for scheduling the one or more first channels of the first priority and a second search space set in the CORESET that corresponds to grant candidates for scheduling the one or more first channels of the first priority and the one or more second channels of the second priority, wherein the first search space set corresponds to grant candidates for scheduling the one or more first channels of the first priority based at least in part on the first priority being higher than the second priority; and
transmitting, to the UE, a grant scheduling the one or more first channels of the first priority over control channel elements corresponding to a search space of the first search space set,
wherein the grant candidates for scheduling the one or more first channels of the first priority corresponding to the first search space set are configured for blind decoding before the grant candidates for scheduling the one or more first channels of the first priority corresponding to the second search space in accordance with the first priority being higher than the second priority.

16. The method of claim 15, further comprising:
transmitting, to the UE, signaling indicating the first search space set.

17. The method of claim 16, further comprising:
transmitting, to the UE, signaling indicating a third search space set, wherein the first search space set is a subset of the third search space set, and wherein each search space of the third search space set that is not a search space of the first search space set is a search space of the second search space set.

18. The method of claim 15, further comprising:
transmitting, to the UE, signaling that indicates a format for the grant candidates associated with the first search space set.

19. The method of claim 15, further comprising:
transmitting, to the UE, a grant for scheduling the one or more second channels of the second priority over second control channel elements corresponding to a search space of the second search space set based at least in part on the first search space set being associated with the first priority.

20. The method of claim 15, further comprising:
refraining from transmitting, to the UE, a second grant for scheduling the one or more first channels of the first priority over one or more control channel elements corresponding to a search space of the second search space set based at least in part on the second search space set being associated with the one or more second channels of the second priority.

21. The method of claim 15, wherein the grant comprises downlink control information (DCI).

22. An apparatus for wireless communication at a user equipment (UE), comprising:
a processor,
memory coupled with the processor, and
instructions stored in the memory and executable by the processor to cause the apparatus to:
receive signaling that indicates a first search space set in a control-resource set (CORESET) that corresponds to grant candidates for scheduling one or more first channels of a first priority;
determine a second search space set in the CORESET that corresponds to grant candidates for scheduling the one or more first channels of the first priority and one or more second channels of a second priority, wherein the first search space set corresponds to grant candidates for scheduling the one or more first channels of the first priority based at least in part on the first priority being higher than the second priority; and
perform blind decoding, within a search space of the first search space set, for a grant scheduling the one or more first channels of the first priority before performing blind decoding for the grant in the second search space set in accordance with the first priority being higher than the second priority.

23. The apparatus of claim 22, wherein the instructions are further executable by the processor to cause the apparatus to:
transmit, to a base station and prior to receiving the signaling, an indication that the UE is capable of supporting the one or more first channels of the first priority and the one or more second channels of the second priority, wherein the signaling is received from the base station.

24. The apparatus of claim 22, wherein the instructions are further executable by the processor to cause the apparatus to:
receive signaling that indicates a third search space set, wherein the first search space set is a subset of the third search space set, and wherein the second search space set comprises determining each search space of the third search space set that is not a search space of the first search space set.

25. The apparatus of claim 22, wherein the instructions are further executable by the processor to cause the apparatus to:
receive signaling that indicates a format for the grant candidates associated with the first search space set.

26. The apparatus of claim 22, wherein the second search space set further corresponds to additional grant candidates scheduling the one or more second channels of the second priority, and wherein the instructions are further executable by the processor to cause the apparatus to:
decode a grant for scheduling the one or more second channels of the second priority within a search space of the second search space set.

27. The apparatus of claim 22, wherein the instructions are further executable by the processor to cause the apparatus to:
perform blind decoding in each search space of the first search space set; and
fail to decode, in each search space of the first search space set, a grant for scheduling the one or more second channels of the second priority based at least in part on the first search space set being associated with the one or more first channels of the first priority.

28. The apparatus of claim 22, wherein the instructions are further executable by the processor to cause the apparatus to:
determine that the grant is for scheduling the one or more first channels of the first priority based at least in part on a radio network temporary identifier associated with the grant, a priority indication bit field associated with the grant, or a combination thereof.

29. The apparatus of claim 22, wherein the instructions are further executable by the processor to cause the apparatus to:
perform blind decoding in each search space of the second search space set; and
fail to decode, in each search space of the second search space set, a grant for scheduling the one or more first channels of the first priority based at least in part on the second search space set being associated with the one or more second channels of the second priority.

30. An apparatus for wireless communications, comprising:
a processor,
memory coupled with the processor, and
instructions stored in the memory and executable by the processor to cause the apparatus to:
receive, from a user equipment (UE), an indication that the UE is capable of supporting one or more first channels of a first priority and one or more second channels of a second priority, wherein the first priority is higher than the second priority;
identify a first search space set in a control-resource set (CORESET) that corresponds to grant candidates for scheduling the one or more first channels of the first priority and a second search space set in the CORESET that corresponds to grant candidates for scheduling the one or more first channels of the first priority and the one or more second channels of the second priority, wherein the first space set corresponds to grant candidates for scheduling the one or more first channels of the first priority based at least in part on the first priority being higher than the second priority; and
transmit, to the UE, a grant for scheduling the one or more first channels of the first priority over control channel elements corresponding to a search space of the first search space set,
wherein the grant candidates for scheduling the one or more first channels of the first priority corresponding to the first search space set are configured for blind decoding before the grant candidates for scheduling the one or more first channels of the first priority corresponding to the second search space in accordance with the first priority being higher than the second priority.

31. The apparatus of claim 30, wherein the instructions are further executable by the processor to cause the apparatus to:
transmit, to the UE, signaling indicating the first search space set.

32. The apparatus of claim 31, wherein the instructions are further executable by the processor to cause the apparatus to:
transmit, to the UE, signaling indicating a third search space set, wherein the first search space set is a subset of the third search space set, and wherein each search space of the third search space set that is not a search space of the first search space set is a search space of the second search space set.

33. The apparatus of claim 30, wherein the instructions are further executable by the processor to cause the apparatus to:
transmit, to the UE, signaling that indicates a format for the grant candidates associated with the first search space set.

* * * * *